United States Patent
Imamura et al.

(10) Patent No.: US 11,260,996 B2
(45) Date of Patent: Mar. 1, 2022

(54) LUNAR ORBITING SATELLITE SYSTEM, AND GROUND STATION OF LUNAR ORBITING SATELLITE SYSTEM

(71) Applicant: Mitsubishi Electric Corporation, Tokyo (JP)

(72) Inventors: Naoki Imamura, Tokyo (JP); Shoji Yoshikawa, Tokyo (JP); Kenro Mitsuda, Tokyo (JP); Kazushi Sekine, Tokyo (JP); Kana Tsuneishi, Tokyo (JP); Mitsuhiro Yamazumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 330 days.

(21) Appl. No.: 16/603,242

(22) PCT Filed: May 30, 2017

(86) PCT No.: PCT/JP2017/020040
§ 371 (c)(1),
(2) Date: Oct. 7, 2019

(87) PCT Pub. No.: WO2018/220699
PCT Pub. Date: Dec. 6, 2018

(65) Prior Publication Data
US 2021/0078733 A1    Mar. 18, 2021

(51) Int. Cl.
*B64G 1/24* (2006.01)
*B64G 1/10* (2006.01)
(Continued)

(52) U.S. Cl.
CPC .......... *B64G 1/242* (2013.01); *B64G 1/1085* (2013.01); *B64G 1/244* (2019.05); *H04B 7/185* (2013.01);
(Continued)

(58) Field of Classification Search
CPC ...... B64G 1/242; B64G 1/1085; B64G 1/244; B64G 2001/245; B64G 2001/247;
(Continued)

(56) References Cited

U.S. PATENT DOCUMENTS 5,474,264 A * 12/1995 Lund .................. B64G 1/34
                                                          244/167
5,762,298 A *  6/1998 Chen ..................... B64D 27/24
                                                          244/172.7
(Continued)

FOREIGN PATENT DOCUMENTS

JP     2002533053 A *  4/1999 ............... B64G 3/00
JP     2001518861 A * 10/2001 ............. B64G 1/007
(Continued)

OTHER PUBLICATIONS

"Stellar Structure and Habitable Planet Finding", Cordoba, Jun. 11-15, 2001 (ESA SP-485, Jan. 2002.—The Eddington Baseline Mission—F. Favata (Year: 2002).*
(Continued)

*Primary Examiner* — Behrang Badii
*Assistant Examiner* — Jalal C Coduroglu
(74) *Attorney, Agent, or Firm* — Xsensus LLP

(57) ABSTRACT

A lunar orbiting satellite system executes orbit planning of assigning a function (positioning, communication, and flashing) to an artificial satellite (AS) depending on a relative position of the AS to the moon at a time when the moon and the AS are observed from an input point on the earth, and correcting the relative position, which changes in accordance with the moon revolution period. The system includes: a satellite orbit planner which assigns a function to each ASs forming an AS group flying around the moon depending on a relative position of each ASs to the moon at a time when the moon and ASs are observed from an input
(Continued)

point on the earth, and set a target orbit according to the function; and a satellite controller which causes the each ASs to execute control based on the function to implement switching of the function.

13 Claims, 20 Drawing Sheets

(51) Int. Cl.
    *H04B 7/185*     (2006.01)
    *G01S 19/02*     (2010.01)
(52) U.S. Cl.
    CPC .. *B64G 2001/245* (2013.01); *B64G 2001/247* (2013.01); *G01S 19/02* (2013.01)
(58) Field of Classification Search
    CPC ............ B64G 2001/1064; B64G 1/105; H04B 7/185; G01S 19/02; G01S 19/00
    See application file for complete search history.

(56) References Cited

U.S. PATENT DOCUMENTS

| | | | | |
|---|---|---|---|---|
| 7,982,951 | B1 * | 7/2011 | Innes | G02B 23/16 |
| | | | | 359/430 |
| 10,084,535 | B1 * | 9/2018 | Speidel | H04B 7/18532 |
| 2002/0091991 | A1 * | 7/2002 | Castro | G06F 9/06 |
| | | | | 717/106 |
| 2015/0375876 | A1 * | 12/2015 | Garber | B64G 1/10 |
| | | | | 244/158.4 |

FOREIGN PATENT DOCUMENTS

| | | | | | |
|---|---|---|---|---|---|
| JP | 2002-533053 | A | | 10/2002 | |
| JP | 2004-156999 | A | | 6/2004 | |
| JP | 2004156999 | A | * | 6/2004 | ............... B64G 3/00 |
| JP | 2009-244143 | A | | 10/2009 | |
| JP | 2009244143 | A | * | 10/2009 | ............... B64G 1/10 |
| JP | 2012-183855 | A | | 9/2012 | |
| JP | 2012183855 | A | * | 9/2012 | ............... B64G 3/00 |
| JP | 2013-203164 | A | | 10/2013 | |
| JP | 2013203164 | A | * | 10/2013 | ............... B64G 1/10 |
| JP | 2016197093 | A | * | 11/2016 | ............. G01S 19/53 |

OTHER PUBLICATIONS

FEEP Thruster Nano-Satellite Applications—W.C.P Ferando—Cranfield University—School of Engineering—PhD Thesis (Year: 2004).*

International Search Report and Written Opinion dated Jul. 25, 2017 for PCT/JP2017/020040 filed on May 30, 2017, 8 pages including English Translation of the International Search Report.

* cited by examiner

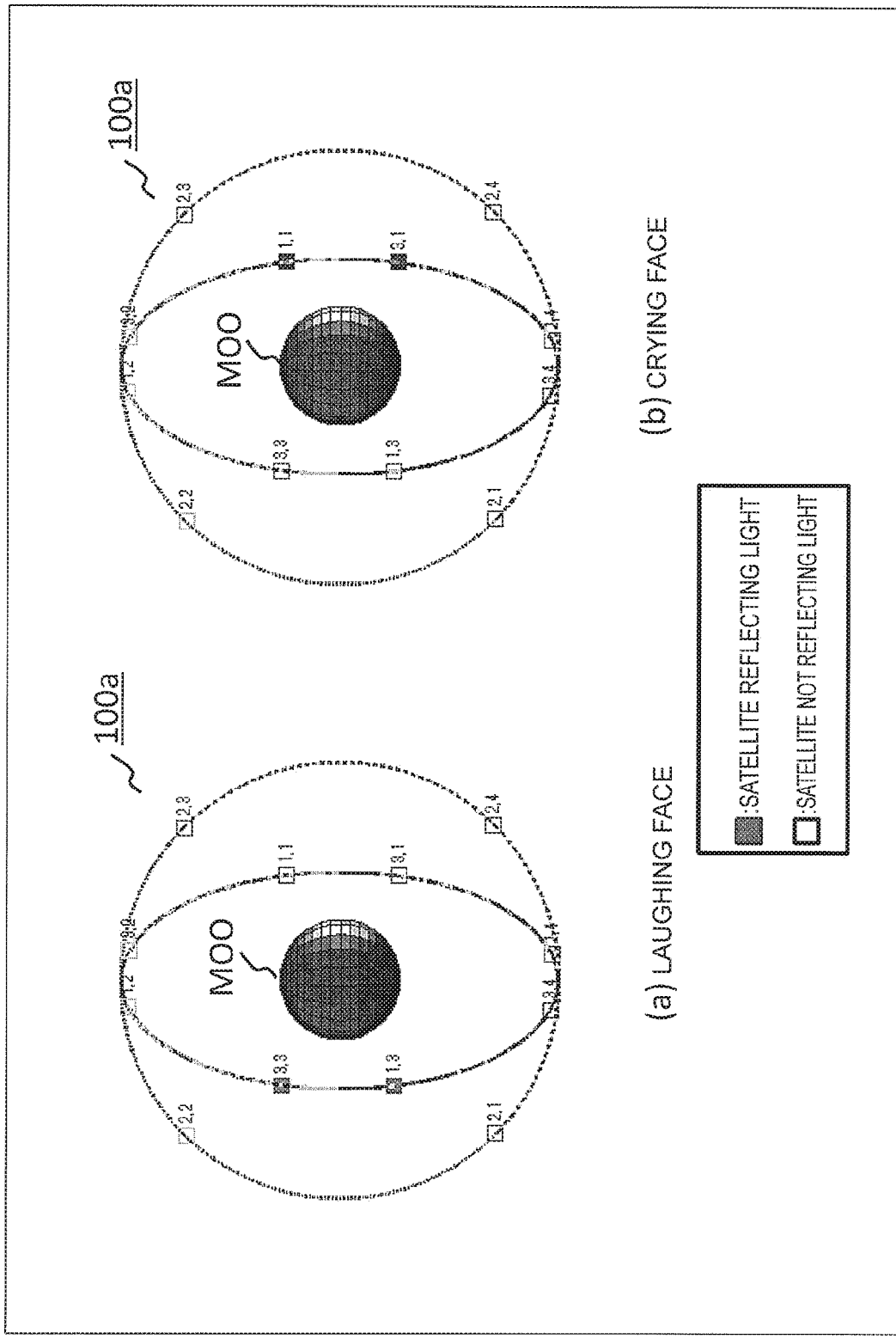

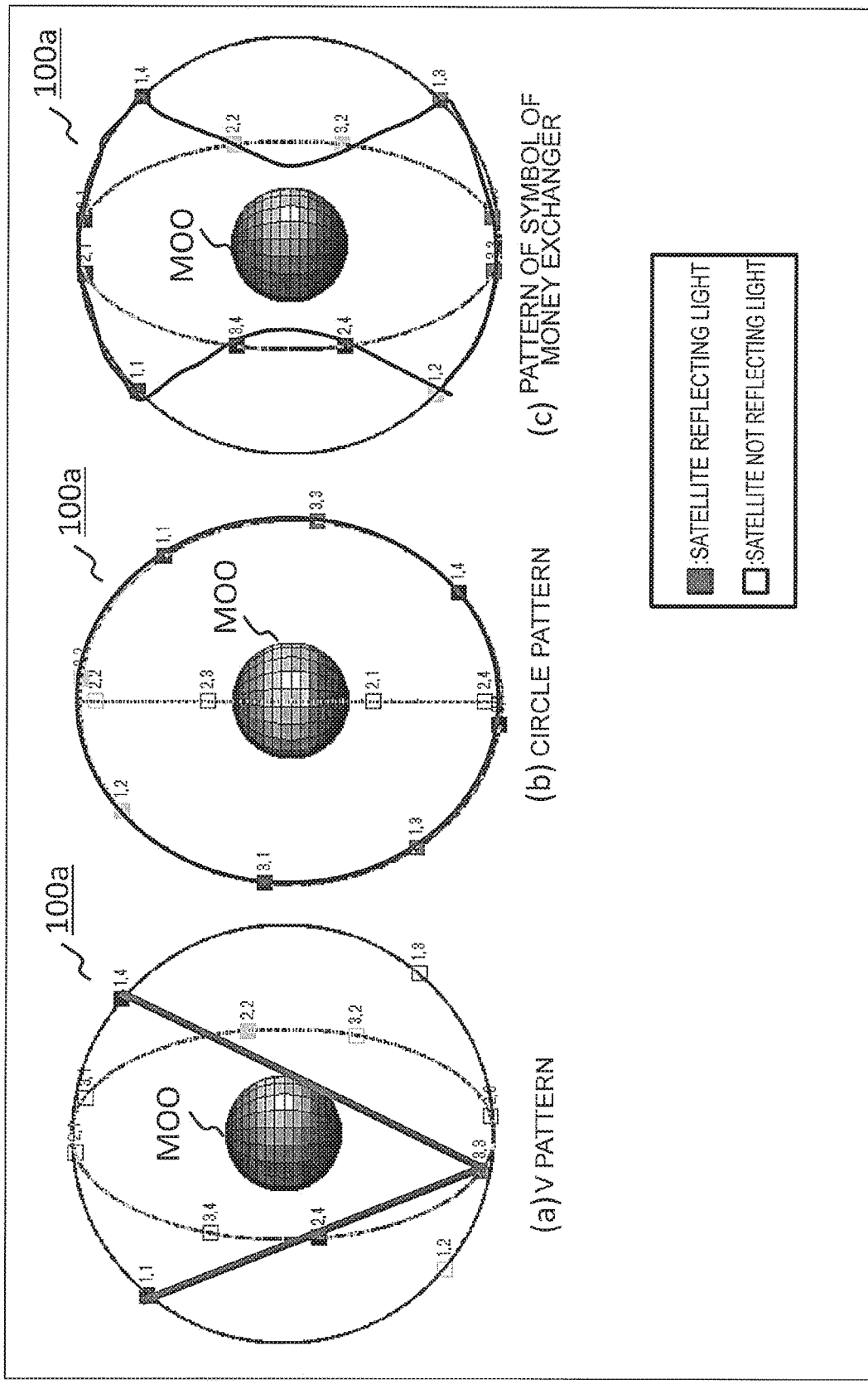

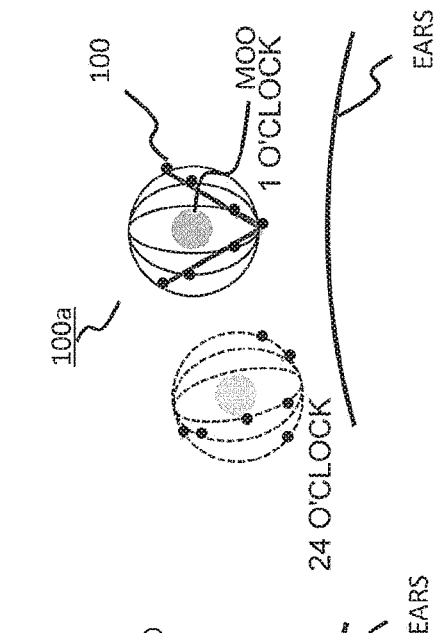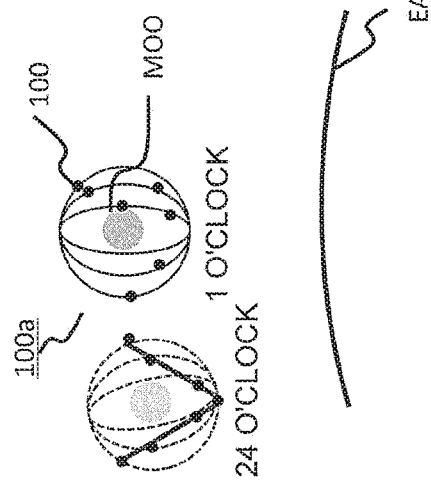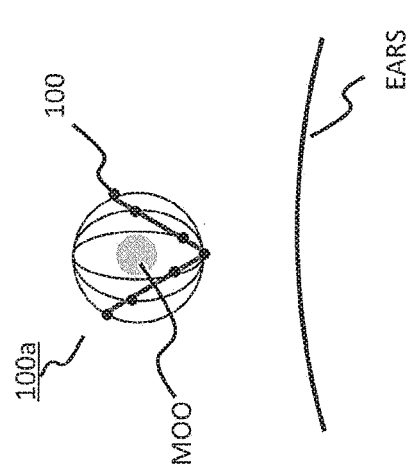

LUNAR ORBITING SATELLITE SYSTEM, AND GROUND STATION OF LUNAR ORBITING SATELLITE SYSTEM

CROSS-REFERENCE TO RELATED APPLICATIONS

The present application is based on PCT filing PCT/JP2017/020040, filed May 30, 2017, the entire contents of which are incorporated herein by reference.

TECHNICAL FIELD

The present invention relates to a lunar orbiting satellite system and the like configured to control a plurality of artificial satellites so as to form a predetermined pattern of a group of the artificial satellites.

BACKGROUND ART

There are known a positioning method and a positioning device configured to use GPS signals output from low-orbit GPS satellites as well as correction data from high-orbit satellites so as to be able to execute highly precise positioning independently of a place of a mobile body in mobile communication using artificial satellites (for example, see Patent Literature 1).

Moreover, there is known an artificial satellite including a reflection mirror configured to reflect the sunlight to the ground, and a transceiver. The transceiver receives information for defining a direction of a reflection surface of the reflection mirror based on the position of the sun, the position of the artificial satellite, and an irradiated point on the ground, which is irradiated with the sunlight, to thereby direct the reflection surface of the reflection mirror toward the direction defined by the information (for example, see Patent Literature 2).

CITATION LIST

Patent Literature

[PTL 1] JP 2004-156999 A (lines 36 to 43 of page 4 and FIG. 1)

[PTL 2] JP 2012-183855 A (lines 9 to 20 of page 4 and FIG. 1)

SUMMARY OF INVENTION

Technical Problem

However, in Patent Literature 1, there is such a problem that the artificial satellite cannot be assigned to a function such as communication and the like other than GPS positioning depending on the relative position of the artificial satellite with respect to the earth.

Moreover, in Patent Literature 2, an orbit on which the artificial satellite or the artificial satellite group flies is an earth orbit such as the sun-synchronous orbit and the Dawn-Dusk orbit, resulting in such a problem that the technology cannot be applied to a case in which the artificial satellite or the artificial satellite group flies on an orbit other than the earth orbit. Moreover, specific orbit control and attitude control methods for flashing light toward the ground are not clear in the artificial satellite or the artificial satellite group flying on the earth orbit.

The present invention has been made in view of the above-mentioned problems, and therefore has an object to provide a lunar orbiting satellite system and the like configured to execute orbit planning of assigning a function (positioning, communication, and the like) to an artificial satellite depending on a relative position of the artificial satellite with respect to the moon at a time when the moon and the artificial satellite are observed from an input point on the earth, and correcting the relative position, which changes depending on the revolution period of the moon revolving around the earth.

Solution to Problem

According to one embodiment of the present invention, there is provided a lunar orbiting satellite system and the like including: a plurality of artificial satellites forming an artificial satellite group flying around the moon; a control unit configured to control the plurality of artificial satellites; and an input unit configured to receive input of information for the control, wherein the control unit includes: a satellite orbit planning unit configured to assign a function to one of the plurality of artificial satellites in accordance with a two-dimensional projected relative position of the one of the plurality of artificial satellites with respect to the moon at a time when the moon and the one of the plurality of artificial satellites are observed from an input set point on the earth, and set a target orbit in accordance with the function; and a satellite control unit configured to cause the one of the plurality of artificial satellite to execute control based on the function, to thereby switch the function.

Advantageous Effects of Invention

According to the present invention, the function of the artificial satellite is assigned depending on the relative position of the artificial satellite with respect to the moon at a time when the moon and the artificial satellite are observed from the input point on the earth, and thus it is possible to increase efficiency of use of the artificial satellite having a so-called standby time in which the function is not available, and freely design a state in which the satellite can be observed from the earth.

BRIEF DESCRIPTION OF DRAWINGS

FIG. 15 includes diagrams for illustrating an example of an entertainment service provided by the lunar orbiting satellite system according to the third embodiment of the present invention.

FIG. 16 includes diagrams for illustrating another example of the entertainment service provided by the lunar orbiting satellite system according to the third embodiment of the present invention.

FIGS. 17A to 17C are diagrams for illustrating examples of how the moon and the artificial satellites are seen from the ground surface in the entertainment service provided by the lunar orbiting satellite system according to the third embodiment of the present invention.

DESCRIPTION OF EMBODIMENTS

Now, a lunar orbiting satellite system and the like according to each of embodiments of the present invention are described with reference to the drawings. In each of the embodiments, the same or corresponding portions are denoted by the same reference symbols, and the overlapping description thereof is omitted.

First Embodiment

Figure 1:
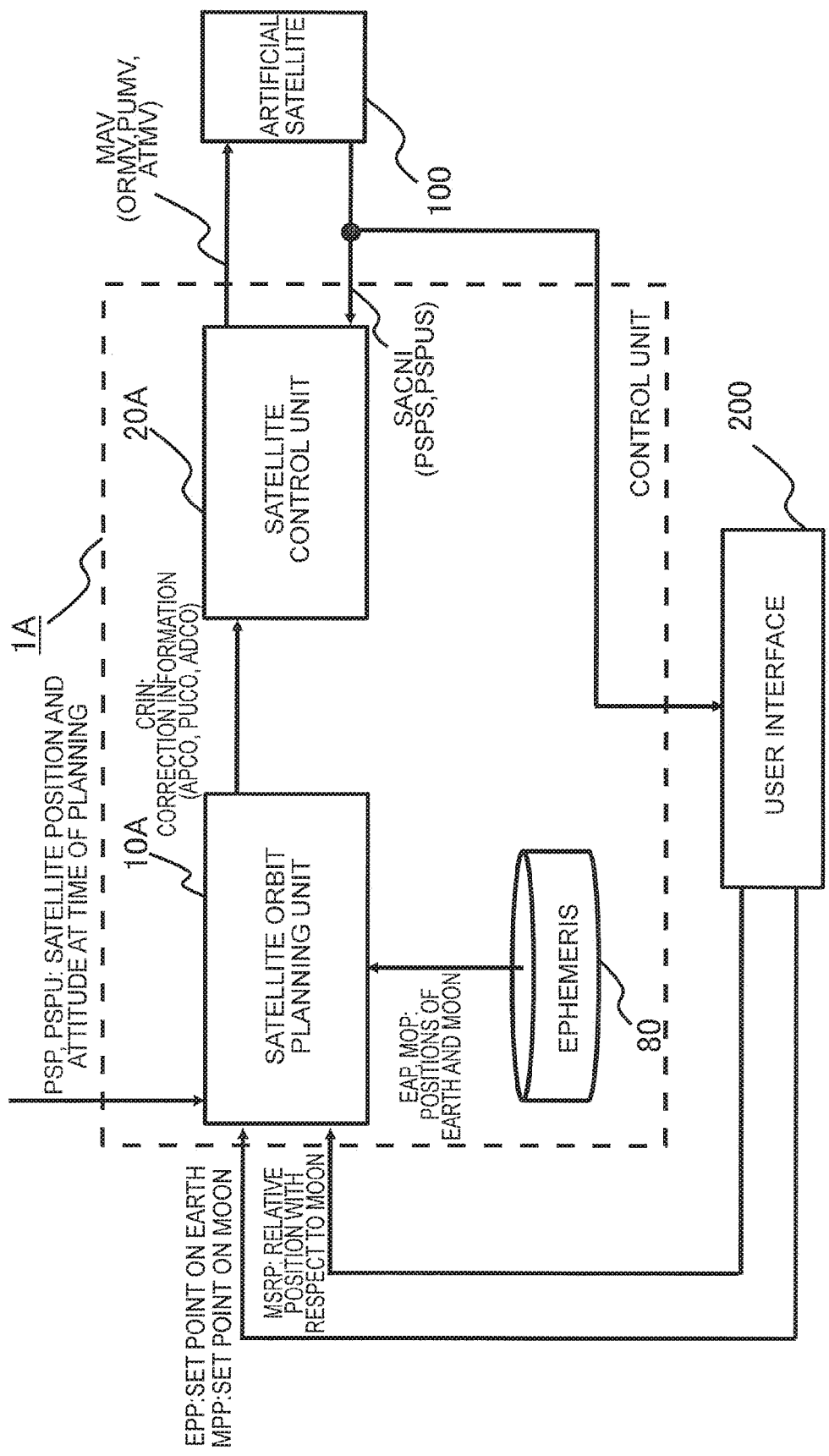
FIG. 1 is a schematic functional block diagram for illustrating an overall configuration of a lunar orbiting satellite system according to a first embodiment of the present invention.

FIG. 1 is a schematic functional block diagram for illustrating an overall configuration of a lunar orbiting satellite system according to a first embodiment of the present invention. The lunar orbiting satellite system includes a control unit 1A, an artificial satellite 100, and a user interface 200. The user interface 200 is an input unit. Further, the control unit 1A includes a satellite orbit planning unit 10A, a satellite control unit 20A, and an ephemeris 80 accommodated in a storage unit.

In the first embodiment of the present invention, a detailed description is now given of a configuration of using artificial satellites orbiting around the moon to execute, for example, communication between a base on the lunar surface and the ground. It is assumed that a communication device for relaying communication between the ground and the moon is provided in each of all the artificial satellites for the sake of clear description.

Figure 20:
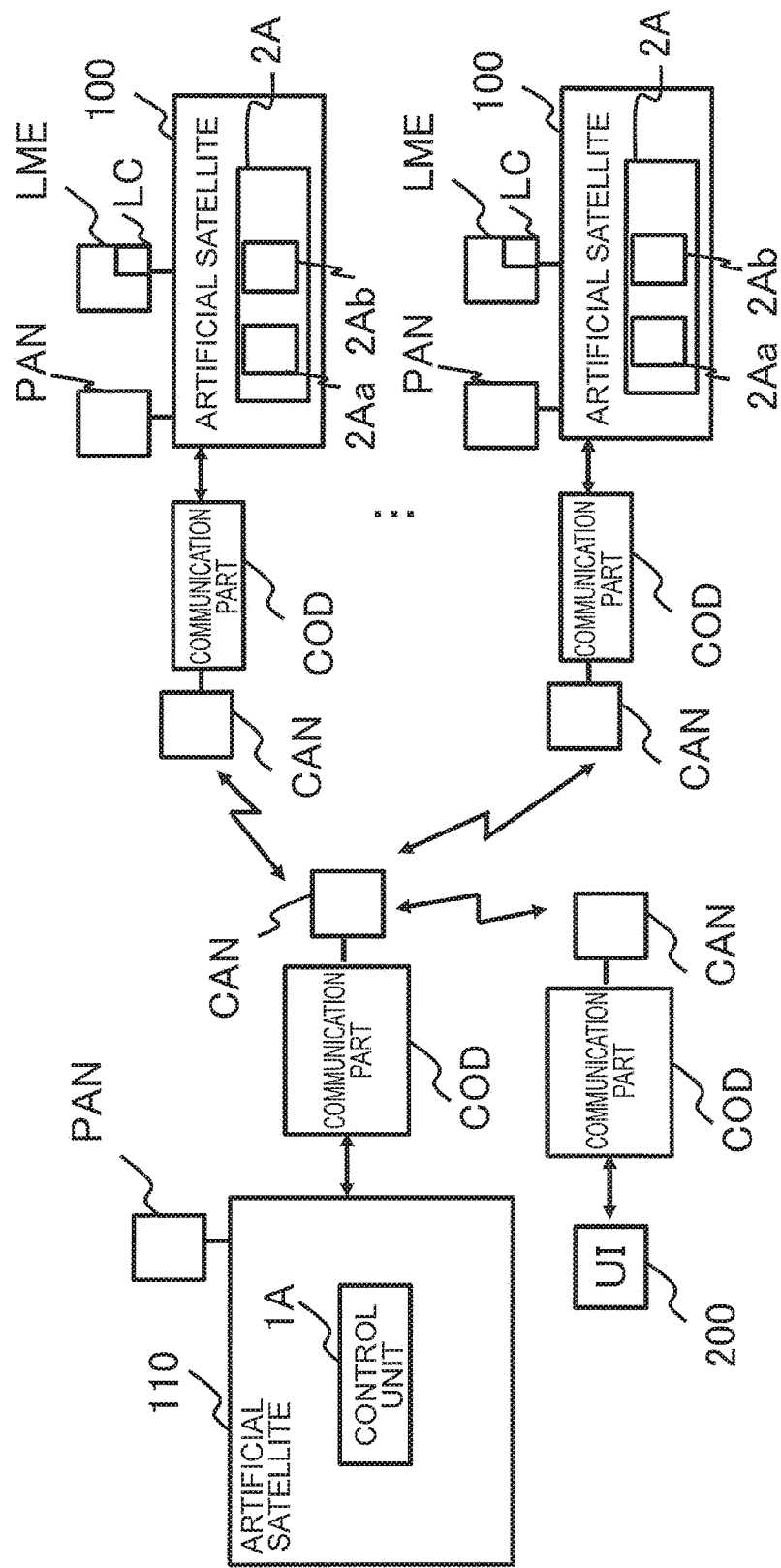
FIG. 20 is a block diagram for illustrating a communication configuration of the lunar orbiting satellite system according to each embodiment of the present invention.

As schematically illustrated in FIG. 20, for example, when a control unit 1A is arranged in one artificial satellite 110 or on the ground side, the control unit 1A, the artificial satellites 100, and the user interface 200 are connected to one another for communication through communication units COD, which are communication devices.

Moreover, each of the artificial satellites 100 includes a control unit 2A on the artificial satellite side, a communication antenna group CAN, a positioning antenna group PAN, and a large structured mirror LME. Moreover, the artificial satellite 110 also includes the communication antenna group CAN, and the positioning antenna group PAN controlled by the control unit 1A as well.

In the lunar orbiting satellite system according to one embodiment the present invention, in a broad sense, the arrangement positions are not particularly limited as long as the control unit 1A, the user interface 200, the artificial satellites 100, and further, the satellite orbit planning unit 10A, the satellite control unit 20A, and the storage unit 80 forming the control unit 1A can communicate to/from one another, the antennas, the mirror, and the like can be controlled, and desired control such as positioning, communication, and flashing light can be executed However, it is assumed that the user interface 200 configured to input various commands and information to the system is arranged on the ground.

The artificial satellite 100 orbits around the moon. At least one artificial satellite 100 flies on at least one orbital plane. Orbit control, attitude control, and antenna control set in advance are executed for the artificial satellite 100 based on a maneuvering amount MAV for the control, which is an output from the control unit 1A.

The control unit 1A includes the satellite orbit planning unit 10A. The satellite orbit planning unit 10A inputs:

a set point (EPP) on the earth set in advance,
a set point (MPP) on the moon set in advance,
a relative position (MSRP) of the artificial satellite 100 with respect to the moon,
a position (EAP) of the earth and the position (MOP) of the moon from the ephemeris 80, and
a satellite position at the time of planning (PSP) and a satellite attitude at the time of planning (PSPU) observed by a base station or the like. Moreover, the satellite orbit planning unit 10A assigns a communication function to the artificial satellite 100, calculates a target orbit (TOR) for moving to a satellite arrangement position set in advance from a state of the artificial satellite 100, which has already been flying, and calculates a possible date and time (PDT) at which the communication function becomes available. Further, the satellite orbit planning unit 10A calculates an arrangement position command (APCO), an attitude command (PUCO), and an antenna direction command (ADCO) of the artificial satellite based on the function (FUN), the target orbit (TOR), the possible date and time (PDT), the satellite position at the time of planning (PSP), and the satellite attitude at the time of planning (PSPU). Then, the satellite orbit planning unit 10A outputs the arrangement position command (APCO), the attitude command (PUCO), and the antenna direction command (ADCO) to the satellite control unit 20A. As the function, the communication function is described in the first embodiment, the positioning function is described later in a second embodiment of the present invention, and the flashing function is described in a third embodiment of the present invention as examples. It is assumed that the function (FUN) is contained as information in the target orbit TOR, and the arrangement position command (APCO), the attitude command (PUCO), and the antennal direction command (ADCO) for the artificial satellite, which are correction information CRIN (the same holds true below).

Figure 3:
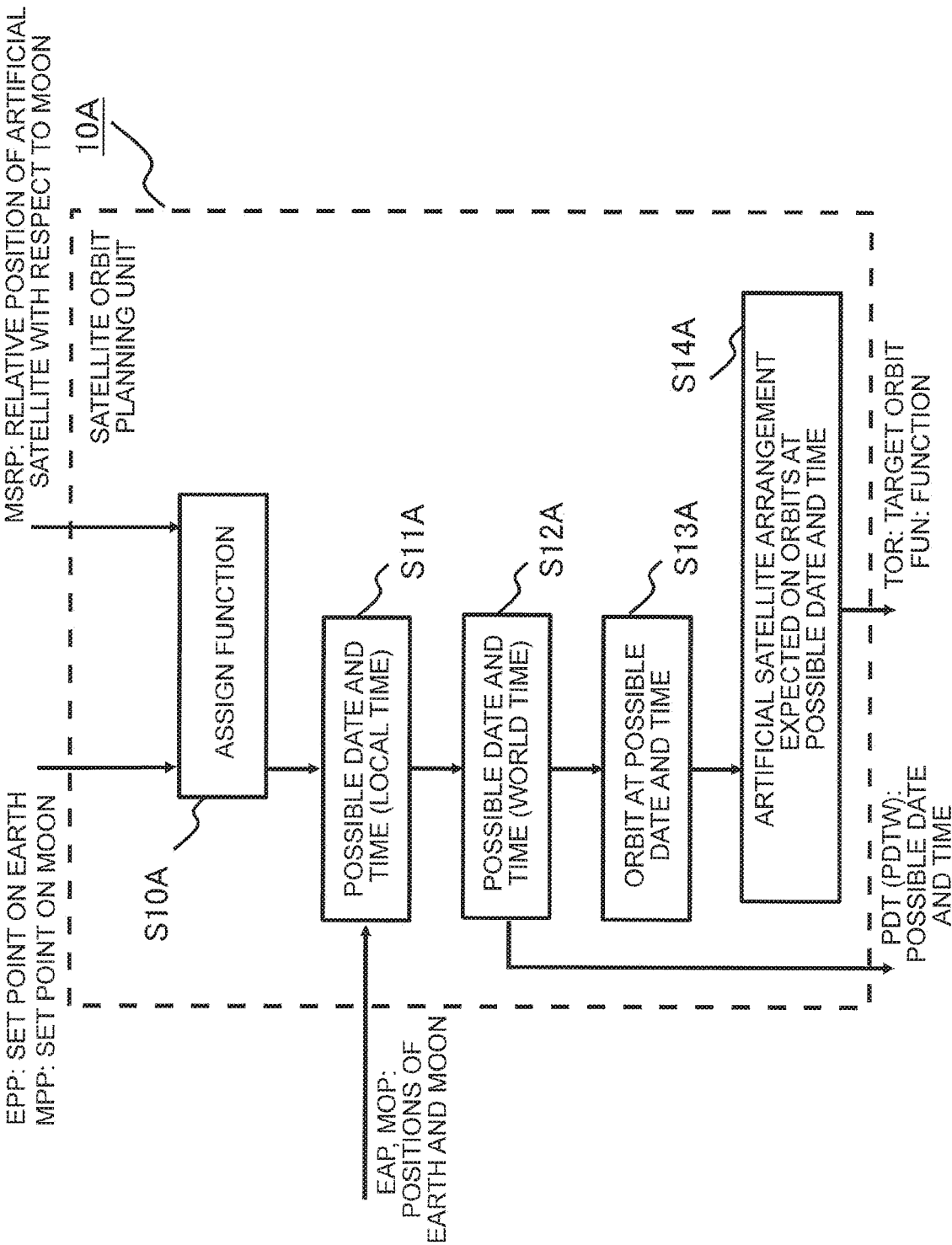
FIG. 3 is an operation flowchart for illustrating a part of an operation of a satellite orbit planning unit in the lunar orbiting satellite system according to the first embodiment of the present invention.
Figure 4:
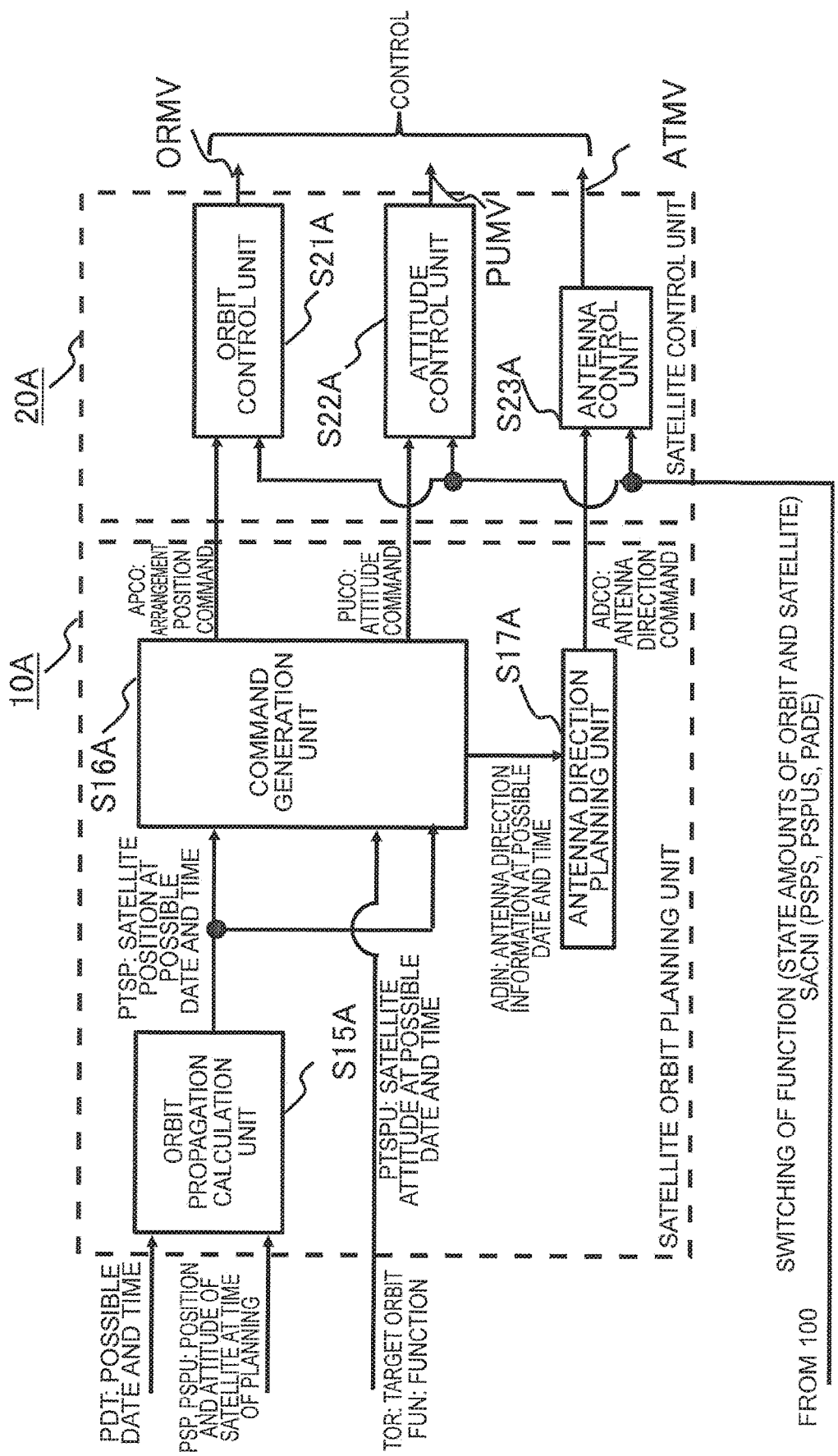
FIG. 4 is a functional block diagram for illustrating a part of the satellite orbit planning unit and a satellite control unit in the lunar orbiting satellite system according to the first embodiment of the present invention.

In the first embodiment, the satellite orbit planning unit 10A, the satellite control unit 20A, the ephemeris 80 of the control unit 1A illustrated in FIG. 1, and control portions formed of respective calculation functions illustrated in FIG. 3 and FIG. 4 for constructing the satellite orbit planning unit 10A, the satellite control unit 20A, and the ephemeris 80 of the control unit 1A may be formed of independent control circuits, or may uniformly be formed of one control circuit. Regarding this point, each of the processing circuits for achieving those calculation functions may be constructed by dedicated hardware or a central processing unit (CPU, which is also referred to as central processing device, processing device, calculation device, microprocessor, microcomputer, processor, and DSP) for executing a program stored in a memory.

Figure 19B:
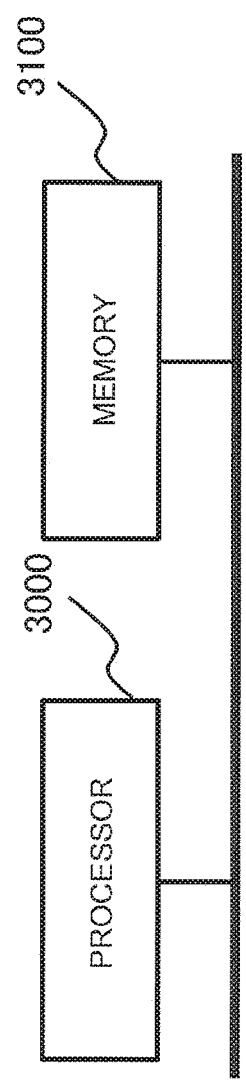
FIGS. 19A and 19B are block diagrams for illustrating hardware configurations of the lunar orbiting satellite system according to each embodiment of the present invention.
Figure 19A:
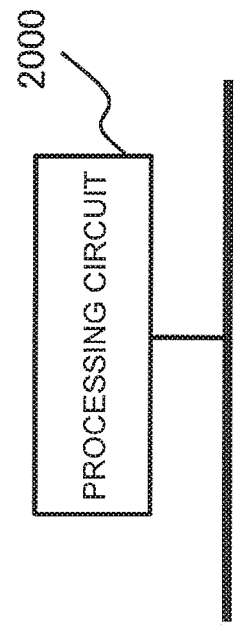

FIGS. 19A and 19B are diagrams for schematically illustrating respective hardware configurations, in which FIG. 19A is a diagram for illustrating a case in which those calculation functions are constructed by hardware, and FIG. 19B is a diagram for illustrating a case in which those calculation functions are constructed by software.

When the calculation functions of the above-mentioned respective units are constructed by the hardware illustrated in FIG. 19A, a processing circuit 2000 corresponds to, for example, a single circuit, a complex circuit, a programmed circuit, a processor for a parallel program, an ASIC, an FPGA, and a combination thereof. The calculation function of each unit may be implemented by a separate processing circuit, or all the functions of those units may be implemented by one processing circuit.

When the functions of the above-mentioned respective units are constructed by a CPU illustrated in FIG. 19B, the calculation functions of the respective units are implemented by software, firmware, or a combination of software and firmware. The software and the firmware are written as programs, and stored in a memory 3100. A processor 3000, which is a processing circuit, reads and executes the program stored in the memory 3100, to thereby implement the calculation function of each unit. It is also understood that those programs cause the computer to execute procedures and methods for the respective units. In this case, the memory 3100 corresponds to, for example, a RAM, a ROM, a flash memory, an EPROM, an EEPROM, or other such non-volatile or volatile semiconductor memory, a magnetic disk, a flexible disk, an optical disc, a compact disc, a MiniDisk, or a DVD.

Some parts of the respective calculation functions of the respective units described above may be implemented by dedicated hardware, and other parts may be implemented by software or firmware.

In this manner, the processing circuit can implement the respective calculation functions described above by hardware, software, firmware, or a combination thereof.

Moreover, various types of information required for the processing is set in the circuit in advance in the case of the hardware configuration, or is stored in the memory in advance in the case of the software configuration.

The user interface 200 may be, for example, an interface having a mobile function such as a laptop PC and a smartphone, or it is to be understood that the user interface 200 may be an interface without a mobile function, for example, a desktop PC. Moreover, the communication direction is arbitrary.

Figure 2:
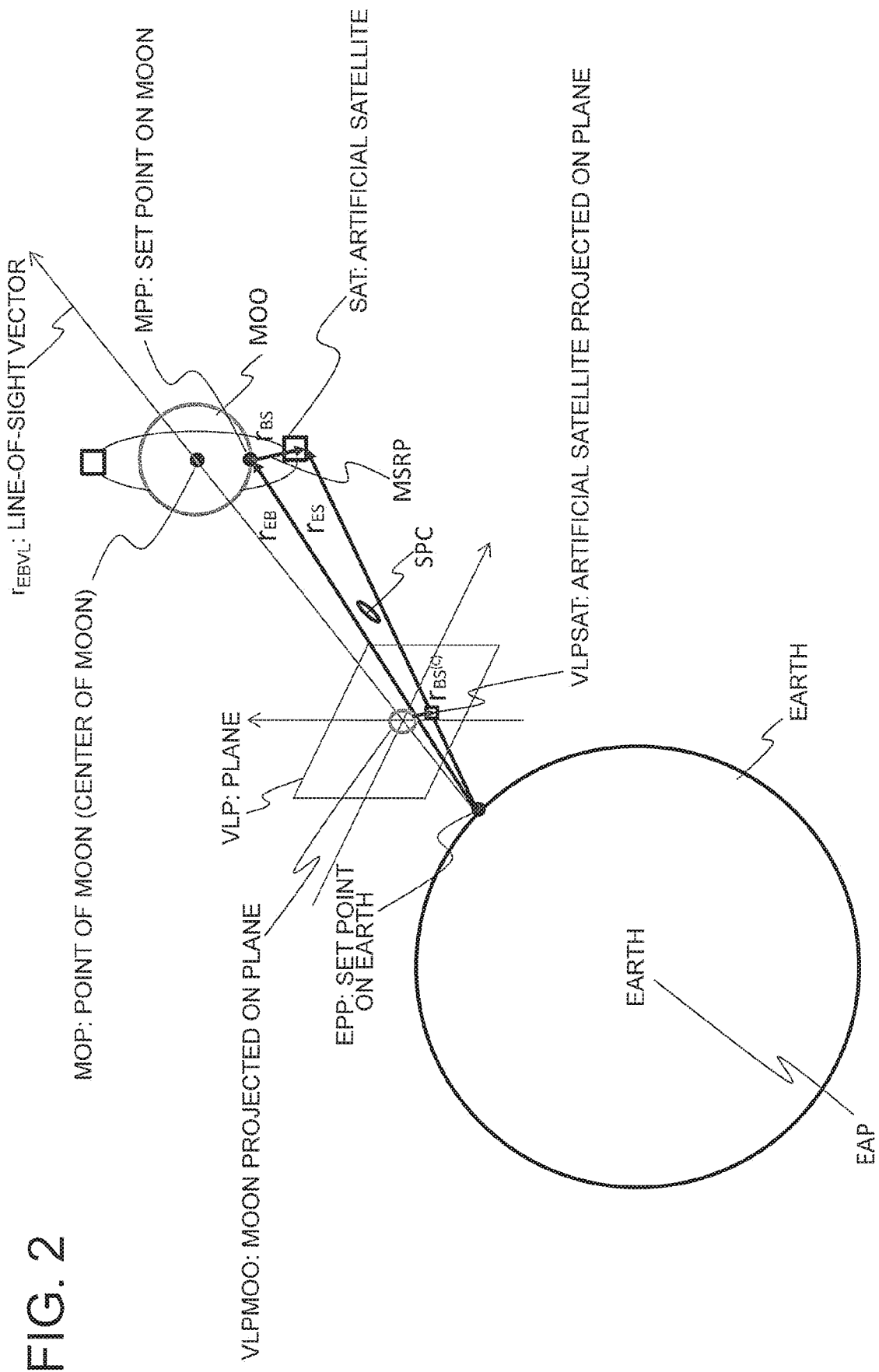
FIG. 2 is a diagram for illustrating a definition of a relative position in the lunar orbiting satellite system according to the first embodiment of the present invention.

Referring to FIG. 2, a description is now given of a definition of the relative position MSRP in the first embodiment of the present invention.

A three-dimensional position vector $r_{BS}$ indicating the relative position MSRP of the artificial satellite with respect to the moon is given by:

$$r_{BS} = r_{ES} - r_{EB}$$

where:

$r_{EB}$ is a position vector from the set point (EPP) on the earth (EAR) to the set point (MPP) on the moon (MOO), and $r_{ES}$ is a three-dimensional position vector from the set point (EPP) on the earth (EAR) to the artificial satellite (SAT).

A line-of-sight vector $r_{EBVL}$ from the set point (EPP) on the earth (EAR) to the position (MOP) of the moon, which is the center of the moon, is defined. Moreover, a line-of-sight plane (VLP) for which the line-of-sight vector $r_{EBVL}$ serves as a normal line is defined. The line-of-sight plane (VLP) is a plane of a photograph of the moon and the artificial satellite taken when a camera is set up at the set point (EPP) on the earth, for example. In this state, the relative position (MSRP) in one embodiment of the present invention is defined as a two-dimensional position vector $r_{BS}^{(C)}$ between a projection (VLPMOO) of the moon and a projection (VLPSAT) of the artificial satellite on the line-of-sight plane (VLP). That is, the relative position (MSRP) corresponds to the two-dimensional position vector ($r_{BS}^{(C)}$) at a time when the three-dimensional position vector $r_{BS}$ is projected on the line-of-sight plane (VLP).

Referring to an operation flowchart of FIG. 3 and a functional block diagram of FIG. 4, a description is now given of the satellite orbit planning unit 10A. As an example, a consideration is given of a state in which there are three polar orbits passing above the south pole of the moon, the radius of the orbit is 3.62 times the radius of the moon, and four artificial satellites are flying on each polar orbit. Then, a lunar base exists, for example, in a vicinity of the south pole of the moon, and is configured to relay communication between the lunar base and the ground when the artificial satellite passes over the south pole. It is assumed that a command of executing continuous communication between the ground and the lunar base without interruption is input from the user interface 200. Specifically, as illustrated in FIG. 3, based on:

the set point (EPP) on the earth corresponding to the position of the base station; and the relative position MSRP of the artificial satellite with respect to the moon, namely, the two-dimensional position vector ($r_{BS}^{(C)}$) at a time when the moon and the artificial satellite are observed from the set point (EPP) on the earth, the communication function is assigned to an artificial satellite that can be observed from both the set point (EPP) on the earth (EAR) and the set point (MPP) on the moon (MOO) (Step S10A).

That is, in Step S10A, a relative position (3DMSRP) at which the artificial satellite can be observed from both of the set point (MPP) on the moon and the set point (EPP) on the earth input from the user interface 200, namely, the three-dimensional position vector $r_{BS}$ is obtained. Thus, the set point (MPP) on the moon is also input to the satellite orbit planning unit 10A from the user interface 200.

While the relative position input from the user interface 200 is the two-dimensional projected relative position, the position obtained in Step S10A is the three-dimensional actual relative position corresponding to the two-dimensional projected relative position. The same holds true below.

The possible date and time (local time) (PDTD) at which the artificial satellite to which the communication function is assigned can actually perform communication are obtained from the positions of the earth and the moon (EAP and MOP), which are information from the ephemeris 80 (Step S11A). The set point (EPP) on the earth corresponding to the base station is known, and thus the possible date and time (world time) (PDTW) are thus determined (Step S12A). The possible date and time (PDT) include the possible date and time (local time) (PDTD) and the possible date and time (world time) (PDTW).

Then, a direction of the orbital plane of the artificial satellite at the possible date and time (world time) (PDTW) can be obtained by a general method of the astrodynamics when orbit control is not particularly executed (Step S13A).

When the respective artificial satellites 100 are arranged at an equal interval on each of the orbital planes, a pattern in which twelve artificial satellites 100 pass over the south pole is determined. When the time point at which each of the artificial satellites 100 passes over the south pole is specified in the world time, the orbital position at this time point is an expected arrangement position (ESAP) of the artificial satellite on the orbit at the possible date and time output in Step S14A, namely, a target orbit TOR.

In this state, the target orbit (TOR) is the expected arrangement position (ESAP) of the artificial satellite for achieving the communication function on the orbital plane on which the artificial satellite 100 is flying. This arrangement position (ESAP) is a region in which a setting error determined in advance is allowed. That is, the target orbit (TOR) is a terminal state at the possible date and time (world time) (PDTW), namely, a terminal time point.

As illustrated in FIG. 4, a position that the satellite reaches at the possible date and time (world time) (PDTW), namely, a satellite position (PTSP) and the satellite attitude (PTSPU) at the possible date and time from the satellite position at the time of planning (PSP) and the satellite attitude at the time of planning (PSPU) observed at the base station or the like when the orbit control for the artificial satellite 100 is not executed is calculated through numerical integration based on a motion equation, namely, an orbit propagation, by an orbit propagation calculation unit S15A, thereby obtaining the satellite position (PTSP) and the satellite attitude (PTSPU) of the artificial satellite 100 at the possible date and time (Step S15A). The orbit propagation is numerically integrated based on the current satellite position (PSP) at the current date and time and the current date and time (PRDT) in the case of the satellite position, for example. This is numerical integration in a case where the current satellite position (PSP) is set to an initial state, and a period from the current date and time (PRDT) to the possible date and time (world time) (PDTW) is fixed. Consideration should be given to such a point that the position and attitude of the satellite at the possible date and time (world time) (PDTW), namely, the terminal state of the satellite is indefinite.

A command generation unit S16A generates the arrangement position command (APCO) and the attitude command (PUCO) for the artificial satellite 100 based on the satellite position (PTSP) and the satellite attitude (PTSPU) of the artificial satellite 100 at the possible date and time (PDT) and the target orbit (TOR) (Step S16A). Further, the command generation unit S16A calculates antenna direction information (ADIN) at the possible date and time containing a direction for directing an antenna mounted on the artificial satellite 100 toward the set point (EPP) on the earth or the set point (MPP) on the moon, and an antenna direction planning unit S17A in a subsequent stage generates the antenna direction command (ADCO) moment by moment (Step S17A).

The arrangement position command (ARCO), the attitude command (PUCO), and the antenna direction command (ADCO) for the artificial satellite 100 correspond to correction information (CRIN) for transition to the target orbit (TOR). As generation means for the arrangement position command (APCO) and the attitude command (PUCO), for example, a publicly known technology represented by the model predictive control can be used. This generation means may be any means as long as the means is configured to successively obtain a command while minimizing an evaluation function set in advance for an interval between the initial state of the satellite position upon planning (PSP) and the terminal state of the artificial satellite 100 at the possible date and time (world time) (PDTW).

Referring to FIG. 4, a description is now given of the satellite control unit 20A. The orbit control unit S21A obtains an orbit control maneuvering amount (ORMV) for such orbit control as to reduce an error between the arrangement position command (APCO) of the artificial satellite 100 and a satellite arrangement position (PSPS) of the artificial satellite at the current time point, which is contained in artificial satellite state information (SACNI) indicating a switching state of the function output from the artificial satellite 100, based on the arrangement position command (APCO) for the artificial satellite 100 and the satellite arrangement position (PSPS) of the artificial satellite at the current time point (Step S21A).

Similarly, the attitude control unit S22A obtains an attitude control maneuvering amount (PUMV) for such attitude control as to reduce an error between the attitude command (PUCO) of the artificial satellite and a satellite attitude (PSPUS) of the artificial satellite at the current time point, based on the attitude command (PUCO) for the artificial satellite 100 and a switching state of the function output from the artificial satellite 100, that is, the satellite attitude (PSPUS) of the artificial satellite at the current time point (Step S22A).

Similarly, the antenna control unit S23A obtains an antenna control maneuvering amount (ATMV) for such antenna control as to reduce an error between the antenna direction command (ADCO) of the artificial satellite and an antenna direction (PADE) of the artificial satellite at the current time point, based on the antenna command (ADCO) for the artificial satellite 100 and a switching state of the function output from the artificial satellite 100, that is, the antenna direction (PADE) of the artificial satellite at the current time point (Step S23A).

PID control, which is a representative example of a classical control theory, can be applied to the orbit control unit S21A, the attitude control unit S22A, and the antenna control unit S23A, but the applicable control is not limited to the PID control.

A simple numerical example of the orbit control for the artificial satellites is now described. An orbital period is changed by changing the orbital altitude of the satellite through a general method of the orbital dynamics, and the satellite position can be moved compared with a case in which the orbital altitude is not changed. For example, when the orbital altitude is 3.62 times the radius of the moon, the orbital period of the lunar orbiting satellite is approximately half a day, and thus one satellite used for relaying communication is in operation for approximately one hour each time.

Moreover, a simple specific example of the attitude control for the artificial satellites is now described. It is assumed that an antenna having a high directivity is used for communication to/from the earth at a long distance, and an antenna having a low directivity or an antenna having a directivity that can electrically be changed is used for communication to/from the lunar base at a small distance. Then, the attitude of the artificial satellite is determined so that a direction axis of the antenna for communication to/from the earth matches the direction of the set point (EPP) on the earth when seen from the artificial satellite. A rotation angle around the antenna direction axis is arbitrary. Thus, this rotation angle is adjusted so that the antenna direction axis for communication to/from the lunar base approaches the direction toward the lunar base. Alternatively, the direction is electrically changed.

It is assumed that the communication function is used only in a period of passage in a vicinity of the sky above the lunar base. It is to be understood that, in the other period, an attitude for directing a solar cell panel toward the sun so that more electric power can be generated or for reducing disturbance to the attitude or an attitude suitable for using other functions can be taken.

With the above-mentioned first embodiment, the communication function of the artificial satellite is assigned depending on the relative position (MSRP) of the artificial satellite with respect to the moon at a time when the moon and the artificial satellite are observed from the input set point (EPP) on the earth, and thus it is possible to increase efficiency of use of the artificial satellite having the so-called standby time in which the function is not available, or freely design a state in which the satellite can be observed from the earth.

Figure 5:
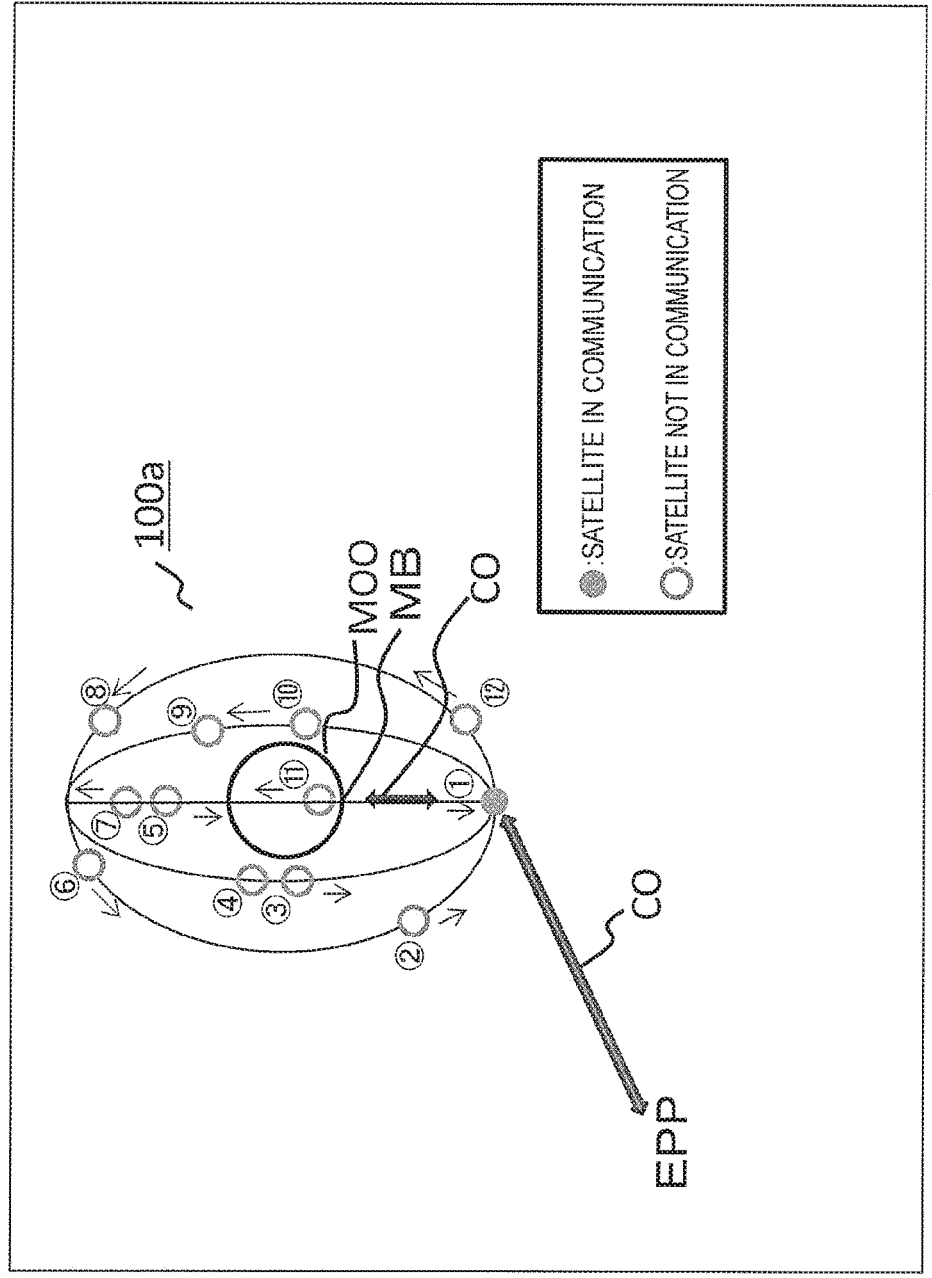
FIG. 5 is a diagram for illustrating an example of a communication service provided by the lunar orbiting satellite system according to the first embodiment of the present invention.

As a specific example of the communication service provided by the lunar orbiting satellite system according to the first embodiment of the present invention, FIG. 5 is a schematic illustration of communication (CO) between the lunar base (MB) in the vicinity of the south pole of the moon (MOO) and the ground (EPP) executed by the artificial satellite group 100*a*. In FIG. 5, a filled satellite is a satellite that performs communication, and outlined satellites are satellites that do not perform communication.

There are three lunar orbital planes passing the poles of the moon (MOO). Four artificial satellites are flying on each of the orbital planes. The artificial satellites are indicated by circled numbers 1 to 12. It is assumed that the satellite 1 is currently providing the communication service. The attitude of the satellite is set so that the antenna for communication to/from the lunar base (MB) is directed to the moon, and the antenna for communication to/from the ground (EPP) is directed to the earth. Then, the satellite 2 comes close to the current position of the satellite 1 approximately one hour later, and the satellite 2 thus takes over the communication service. Subsequently, the satellite 3, the satellite 4, ..., and the satellite 12 successively provide the communication service in turn, and then, the satellite 1 again provides the communication service. The communication service can be continued by the artificial satellites while the artificial satellites are providing the communication service in turn in such a manner.

The moon revolves around the earth in the period of approximately 29.5 days. Therefore, the meridian passage is delayed by approximately one hour per day. Therefore, when the moon is observed at the same time on the following day, the moon is observed at a position displaced toward east by approximately 12 degrees.

Figure 6:
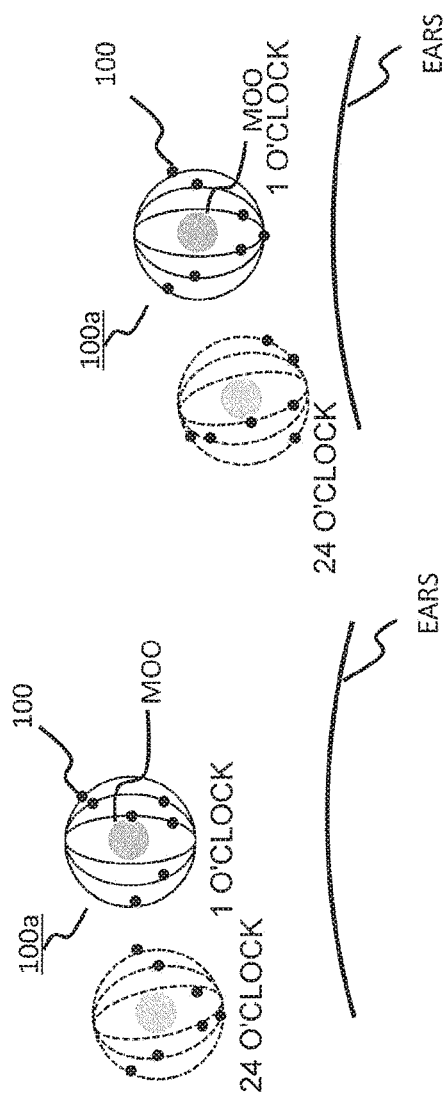
FIGS. 6A to 6C are diagrams for illustrating examples of how the moon and artificial satellites are seen from the ground surface in the communication service provided by the lunar orbiting satellite system according to the first embodiment of the present invention.

FIG. 6A is a diagram for illustrating how the moon (MOO) and the lunar orbiting artificial satellite group 100*a* are observed in the south sky above the earth surface (EARS) at 24 o'clock from the set point (EPP) on the earth.

FIG. 6B is a diagram for illustrating how the moon (MOO) and the lunar orbiting artificial satellite group 100*a* are observed at 24 o'clock and 1 o'clock on the following day in the related art.

FIG. 6C is a diagram for illustrating how the moon (MOO) and the lunar orbiting artificial satellite group 100*a* are observed at 24 o'clock and 1 o'clock on the following day in one embodiment of the present invention.

Thus, the function of the satellite orbit planning unit 10A also includes the adjustment of the orbital period of the artificial satellites 100 by an amount of the shift in the observed position of the artificial satellites 100 caused by the revolution period of the moon (MOO). Specifically, the orbital period of the artificial satellites 100 or the artificial satellite group 100*a* is only required to be adjusted to 1.03 times to 1.05 times (that is, a period equal to or longer than 1.03 times and equal to or shorter than 1.05 times) the rotation period of the earth (EAR) or one integer-th thereof. With this configuration, as illustrated in FIG. 6C, how the moon (MOO) and the lunar orbiting artificial satellite group 100*a* are observed at 1 o'clock on the following day can be the same as how the moon (MOO) and the lunar orbiting artificial satellite group 100*a* are observed at 24 o'clock on the previous day. That is, the observed shapes of the arranged artificial satellites 100 are the same between FIG. 6A and FIG. 6C. That is, the arrangement positions of the artificial satellites can be made to be effective for communication when the moon is observed at approximately the same position on the previous day and the following day.

Second Embodiment

Figure 7:
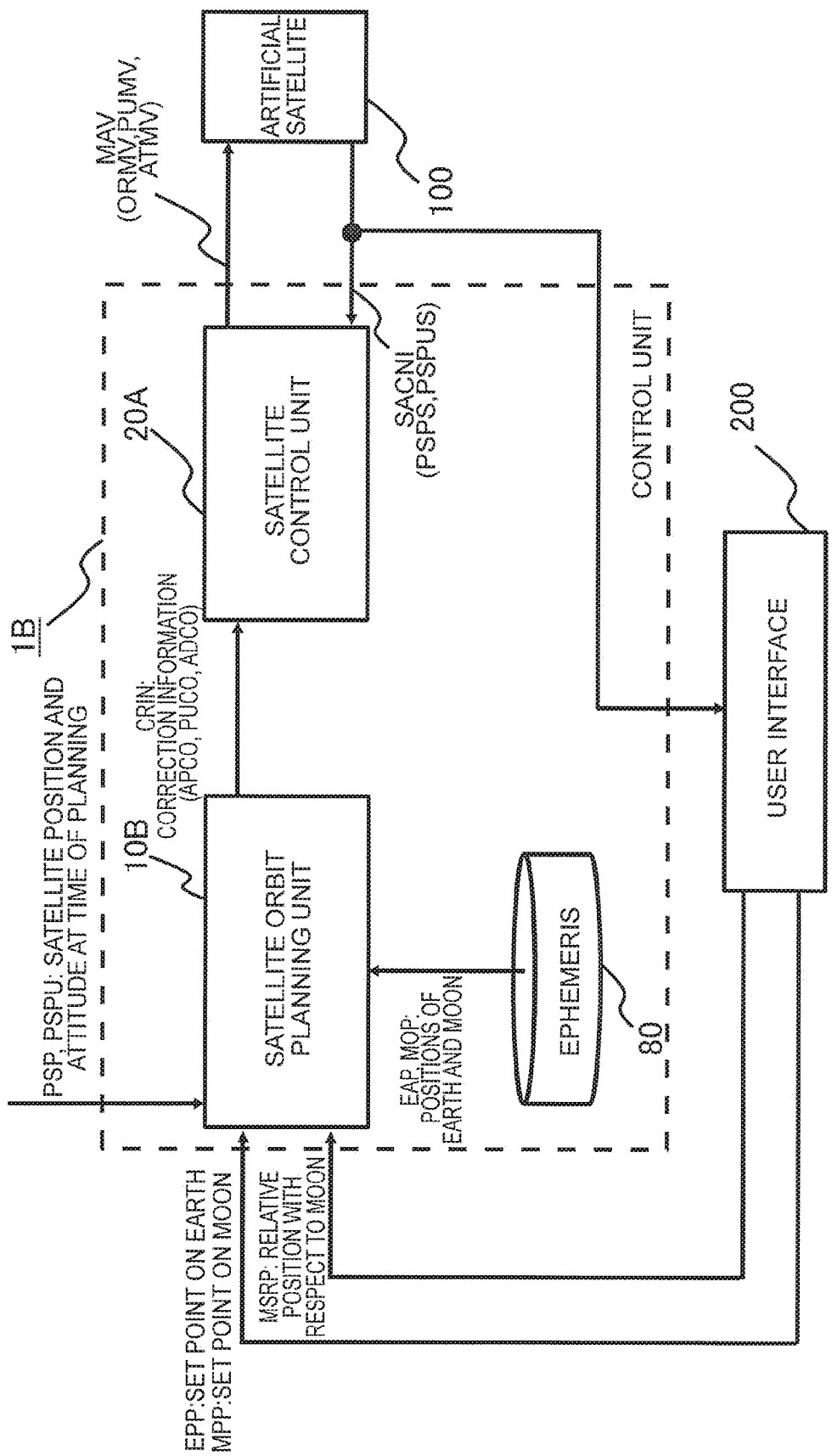
FIG. 7 is a schematic functional block diagram for illustrating the overall configuration of the lunar orbiting satellite system according to a second embodiment of the present invention.

FIG. 7 is a schematic functional block diagram for illustrating an overall configuration of the lunar orbiting satellite system according to the second embodiment of the present invention. A difference between the second embodiment and the first embodiment resides in the control unit 1B, and the other configurations are basically the same. Moreover, the satellite control unit 20A in the control unit 1B is basically the same as the satellite control unit 20A in the first embodiment.

In the second embodiment of the present invention, a description is now given of details of a configuration of using artificial satellites orbiting around the moon to execute, for example, positioning in a vicinity of the south pole on the lunar surface, and positioning of a spacecraft (including the artificial satellite) that is on the way from the earth to the moon. For the sake of clear description, it is assumed that all of the artificial satellites are provided with the global positioning system (GPS).

The artificial satellite 100 orbits around the moon. At least one artificial satellite 100 flies on at least one orbital plane. Orbit control, attitude control, and antenna control set in advance are executed based on an maneuvering amount MAV (ORMV, PUMV, ATMV) for the control, which is an output from the control unit 1B.

The control unit 1B includes the satellite orbit planning unit 10B. The satellite orbit planning unit 10B inputs:

a set point (EPP) on the earth set in advance shown in FIG. 2, a set point (MPP) on the moon set in advance, a relative position (MSRP) of the artificial satellite 100 with respect to the moon, a position (EAP) of the earth and the position (MOP) of the moon from the ephemeris 80, and a satellite position at the time of planning (PSP) and a satellite attitude at the time of planning (PSPU) observed by a base station or the like. Moreover, the satellite orbit planning unit 10B assigns a positioning function to the artificial satellite 100, calculates the target orbit (TOR) for moving to a satellite arrangement position set in advance from a state of the artificial satellite 100, which has already been flying, and further forms the possible date and time (PDT) at which the positioning function becomes available. Further, the satellite orbit planning unit 10B calculates the arrangement position command (APCO), the attitude command (PUCO), and the antenna direction command (ADCO) of the artificial satellite based on the function (FUN), the target orbit (TOR), the possible date and time (PDT), the satellite position at the time of planning (PSP), and the satellite attitude at the time of planning (PSPU). Then, the satellite orbit planning unit 10B outputs the arrangement position command (APCO), the attitude command (PUCO), and the antenna direction command (ADCO) to the satellite control unit 20A. The function is a positioning function in the second embodiment. It is assumed that the function (FUN) is contained as information in the target orbit TOR, and the arrangement position command (APCO), the attitude command (PUCO), and the antennal direction command (ADCO) for the artificial satellite, which are the correction information CRIN.

The relative position MSRP is based on the definition described in the first embodiment.

The hardware configuration in the second embodiment is basically the same as that in the first embodiment described in FIGS. 19A and 19B.

Figure 8:
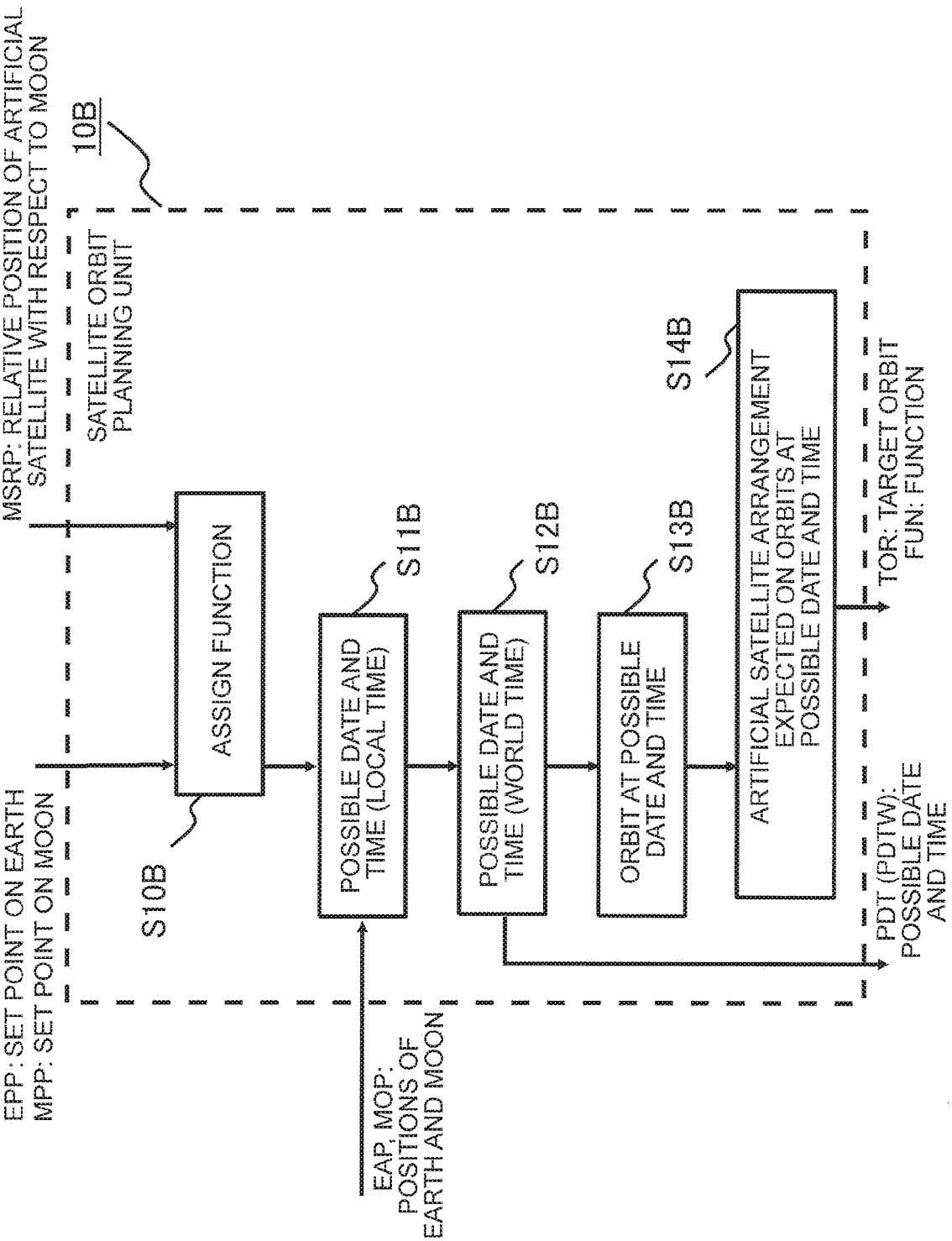
FIG. 8 is an operation flowchart for illustrating a part of an operation of the satellite orbit planning unit in the lunar orbiting satellite system according to the second embodiment of the present invention.
Figure 9:
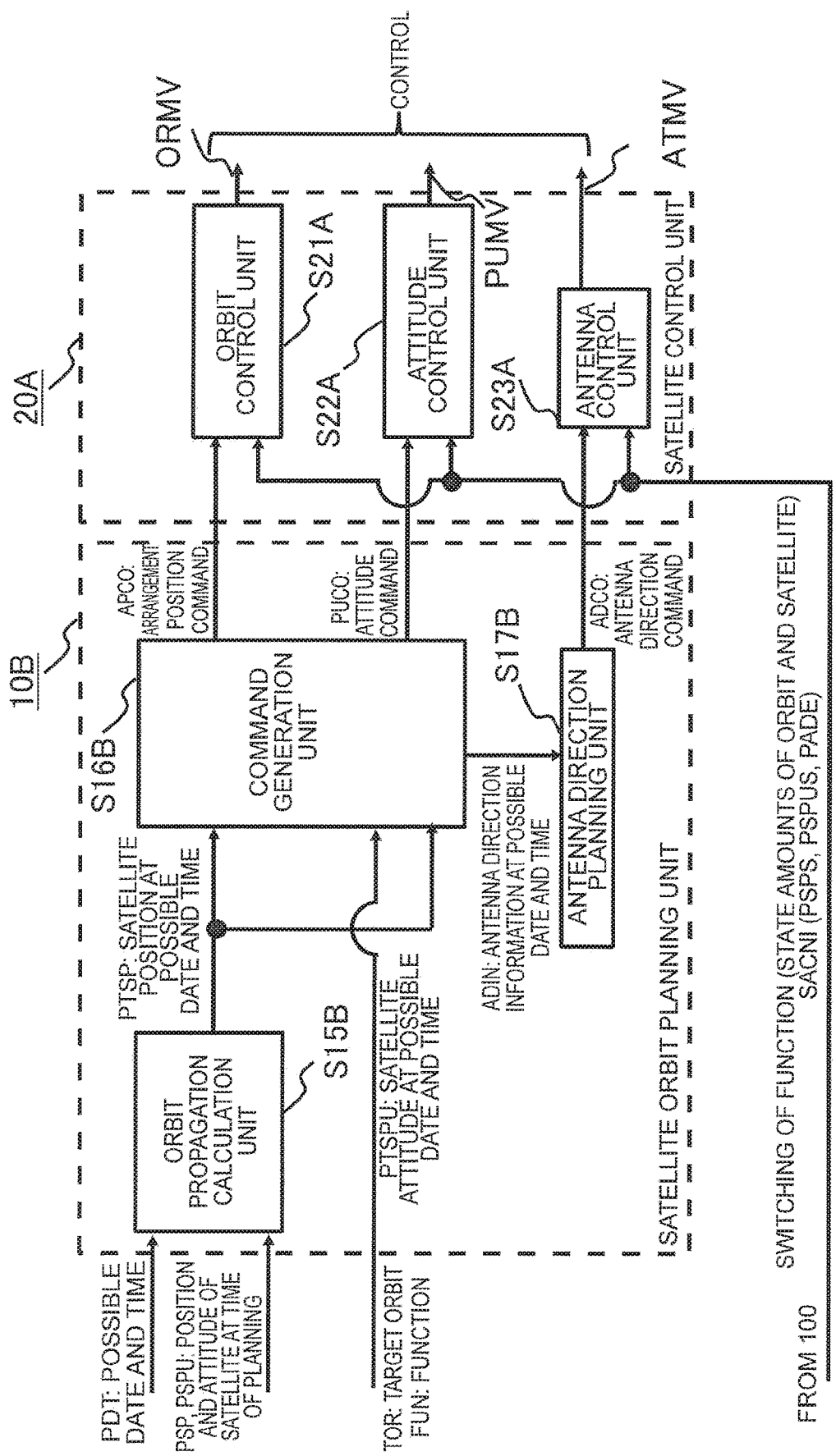
FIG. 9 is a functional block diagram for illustrating a part of the satellite orbit planning unit and the satellite control unit in the lunar orbiting satellite system according to the second embodiment of the present invention.

Referring to an operation flowchart of FIG. 8 and a functional block diagram of FIG. 9, a description is now given of the satellite orbit planning unit 10B. As an example, a consideration is given of a state in which there are three polar orbits passing above the south pole of the moon, the radius of the orbit is 3.62 times the radius of the moon, and four artificial satellites are flying on each polar orbit. Then, it is assumed that a command of executing positioning of the lunar surface in the vicinity of the south pole, and positioning of the spacecraft (see SPC of FIG. 2) flying toward the moon on the artificial satellite is input from the user interface 200. The satellite orbit planning unit 10B obtains the three-dimensional position vector $r_{BS}$ that achieves the relative position MSRP of the artificial satellite with respect to the set point (EPP) on the earth, namely, the two-dimensional position vector ($r_{BS}^{(C)}$), and obtains the three-dimensional position vector $r_{BS}$ that achieves the relative position MSRP of the artificial satellite with respect to the moon, namely, the two-dimensional position vector ($r_{BS}^{(C)}$) at a time when the moon and the artificial satellite are observed from the set point (EPP) on the earth. More specifically, three-dimensional position vectors $r_{BS}$ indicating four or more relative positions (3DMSRPs) at each of which the artificial satellite can be observed from the input set position (MPP) on the moon (MOO), and three-dimensional position vectors $r_{BS}$ indicating four or more relative positions (3DMSRPs) at each of which the artificial satellite can be observed from the input set position (EPP) on the earth are obtained, and the function FUN for positioning is assigned to any one of the artificial satellites that can execute positioning (Step S10B).

The possible date and time (local time) (PDTD) at which the artificial satellite to which the positioning function is assigned can actually perform positioning are obtained from the positions of the earth and the moon (EAP and MOP), which are the information from the ephemeris 80 (Step S11B). The set point (EPP) on the earth corresponding to the base station is known, and thus the possible date and time (world time) (PDTW) are determined (Step S12B).

Then, a direction of the orbital plane of the artificial satellite at the possible date and time (world time) (PDTW) can be obtained by a general method of the astrodynamics when orbit control is not particularly executed (Step S13B).

When the respective artificial satellites 100 are arranged at an equal interval on each of the orbital planes, a pattern in which twelve artificial satellites 100 pass the vicinity of the south pole is determined. When the time point at which each of the artificial satellites 100 passes the vicinity of the south pole and the time point at which each of the artificial satellites 100 can be observed from the set point (EPP) on the earth are specified in the world time, the orbital position at this time point is the expected arrangement position (ESAP) of the artificial satellite on the orbit at the possible date and time output in Step S14B, namely, the target orbit (TOR).

In this state, the target orbit (TOR) is the expected arrangement position (ESAP) of the artificial satellite for achieving the positioning function on the orbital plane on which the artificial satellite 100 is flying. This arrangement position (ESAP) is a region in which a setting error determined in advance is allowed. That is, the target orbit (TOR) is a terminal state at the possible date and time (world time) (PDTW), namely, a terminal time point.

As illustrated in FIG. 9, a position that the satellite reaches at the possible date and time (world time) (PDTW), namely, the satellite position (PTSP) and the satellite attitude (PTSPU) at the possible date and time from the satellite position at the time of planning (PSP) and the satellite attitude at the time of planning (PSPU) observed at the base station or the like when the orbit control for the artificial satellite 100 is not executed is calculated through numerical integration based on a motion equation, namely, an orbit propagation, by the orbit propagation calculation unit S15B, thereby obtaining the satellite position (PTSP) and the satellite attitude (PTSPU) of the artificial satellite 100 at the possible date and time, that is, the possible date and time (world time) (PDTW) (Step S15B). The orbit propagation is numerically integrated based on the current satellite position (PSP) at the current date and time and the current date and time (PRDT) in the case of the satellite position, for example. This is numerical integration when the current satellite position (PSP) is set to an initial state, and a period from the current date and time (PRDT) to the possible date and time (world time) (PDTW) is fixed. Consideration should be given to such a point that the position and the attitude of the satellite at the possible date and time (world time) (PDTW), namely, the terminal state of the satellite is indefinite.

A command generation unit S16B generates the arrangement position command (APCO) and the attitude command (PUCO) for the artificial satellite 100 based on the satellite position (PTSP) and the satellite attitude (PTSPU) at the possible date and time (PDT) of the artificial satellite 100 and the target orbit (TOR) (Step S16B). Further, the command generation unit S16B calculates the antenna direction information (ADIN) at the possible date and time containing the direction for directing an antenna mounted on the artificial satellite 100 toward the set point (EPP) on the earth or the set point (MPP) on the moon, and an antenna direction planning unit S17B in a subsequent stage generates the antenna direction command (ADCO) moment by moment (Step S17B).

The arrangement position command (APCO), the attitude command (PUCO), and the antenna direction command (ADCO) for the artificial satellite 100 correspond to the correction information (CRIN) for transition to the target orbit (TOR). As generation means for the arrangement position command (APCO) and the attitude command (PUCO), for example, a publicly known technology represented by the model predictive control can be used. This generation means may be any means as long as the means is configured to successively obtain a command while minimizing an evaluation function set in advance for an interval between the initial state of the satellite position at the time of planning (PSP) and the terminal state of the artificial satellite 100 at the possible date and time (world time) (PDTW).

The operation of the satellite control unit 20A is basically the same as that in the first embodiment described in FIG. 4.

With the above-mentioned second embodiment, the positioning function of the artificial satellite is assigned depending on the relative position (MSRP) of the artificial satellite with respect to the moon at a time when the moon and the artificial satellite are observed from the input set point (EPP) on the earth, and thus it is possible to increase efficiency of use of the artificial satellite having the so-called standby time in which the function is not available, or freely design a state in which the satellite can be observed from the earth.

Figure 10:
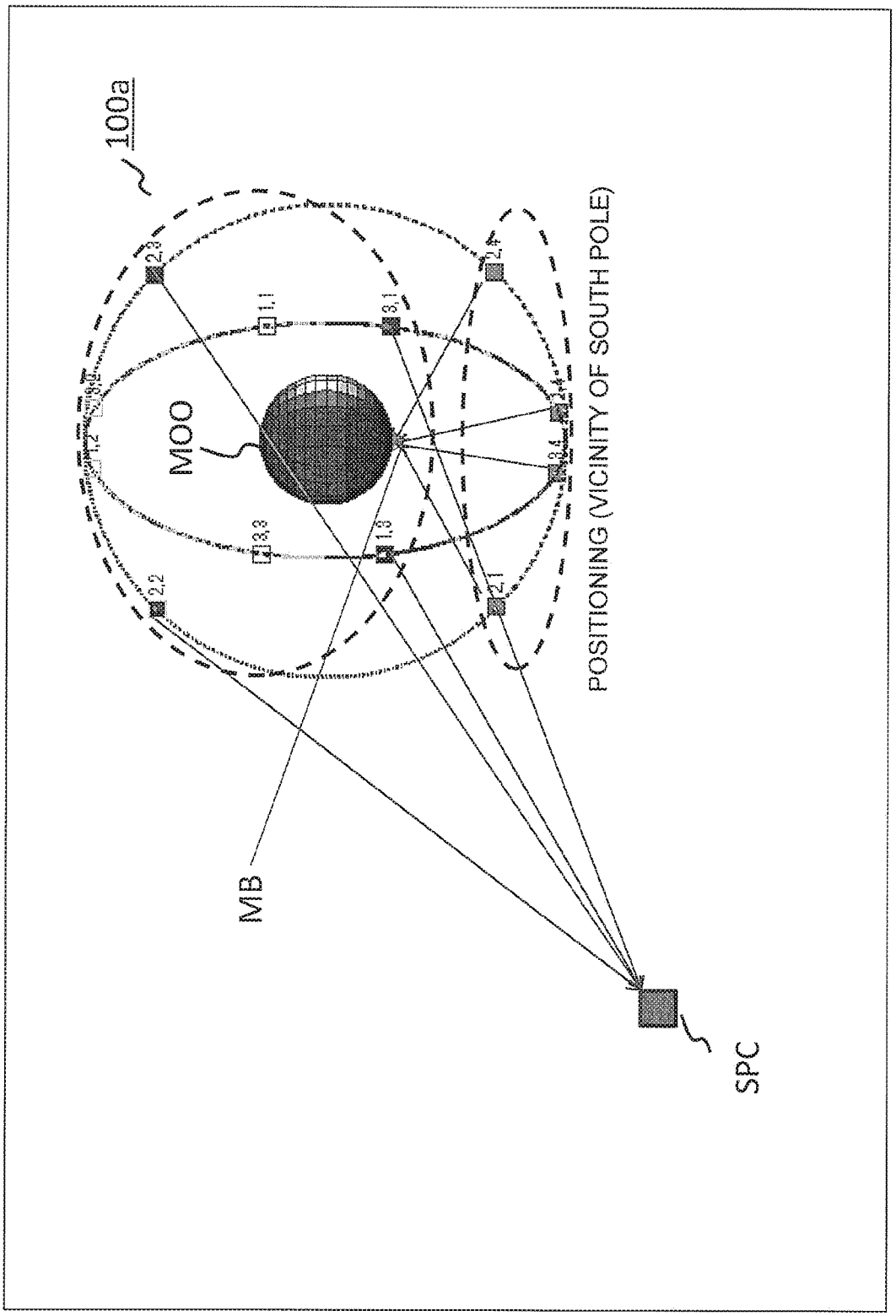
FIG. 10 is a diagram for illustrating an example of a positioning service provided by the lunar orbiting satellite system according to the second embodiment of the present invention.
Figure 11:
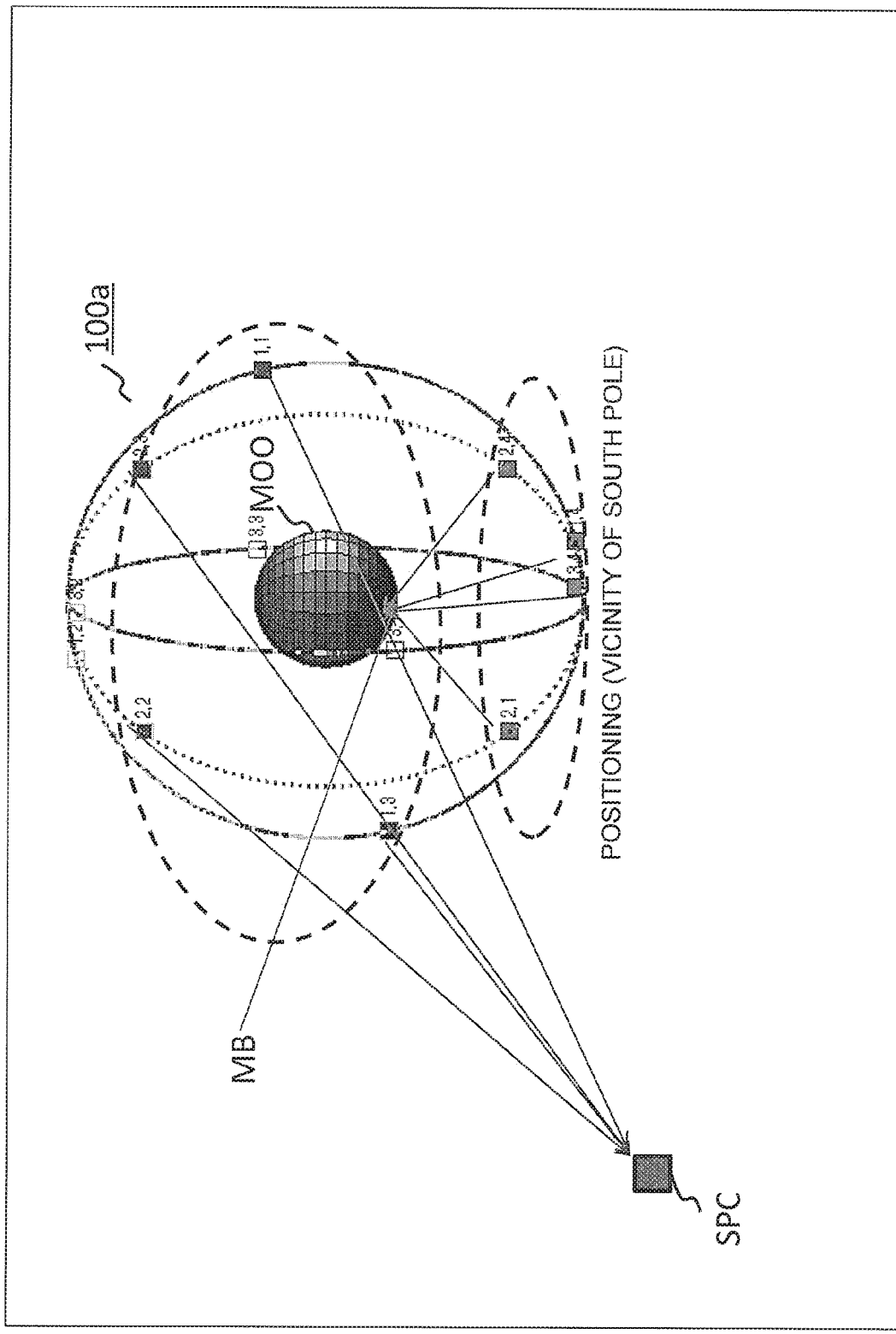
FIG. 11 is a diagram for illustrating an example of the positioning service provided by the lunar orbiting satellite system according to the second embodiment of the present invention.

As an example of the positioning service provided by the lunar orbiting satellite system, FIG. 10 and FIG. 11 are schematic illustrations of the positioning in the vicinity of the south pole at which the lunar base (MB) on the moon (MOO) exists, and the positioning of the spacecraft SPC in the course of flight from the earth toward the moon, which are executed by the artificial satellite group 100a. FIG. 10 is a diagram for illustrating the arrangement positions of the artificial satellite group 100a at a service time point. FIG. 11 is a diagram for illustrating the arrangement positions of the artificial satellite group 100a three to four days after the service time point of FIG. 10. The lunar orbiting satellite system has the three lunar orbital planes passing the poles of the moon. The four artificial satellites (1.1, 1.2, 1.3, and 1.4, 2.1, 2.2, 2.3, and 2.4, 3.1, 3.2, 3.3, and 3.4) are flying on each of the orbital planes. For example, the artificial satellite 1.1 indicates a first vehicle on a first orbital plane. The positioning by the artificial satellites is basically carried out by four satellites. Therefore, the positioning is executed by four artificial satellites flying in the vicinity of the south pole of the moon. The positioning for the spacecraft SPC flying from the earth toward the moon is executed by four artificial satellites that are other than those four satellites, and are located at arrangement positions that minimize the dilution of precision (DOP). The spacecraft in the course of flight from the earth toward the moon can be positioned simultaneously with the positioning on the lunar surface in such a manner.

Third Embodiment

Figure 12:
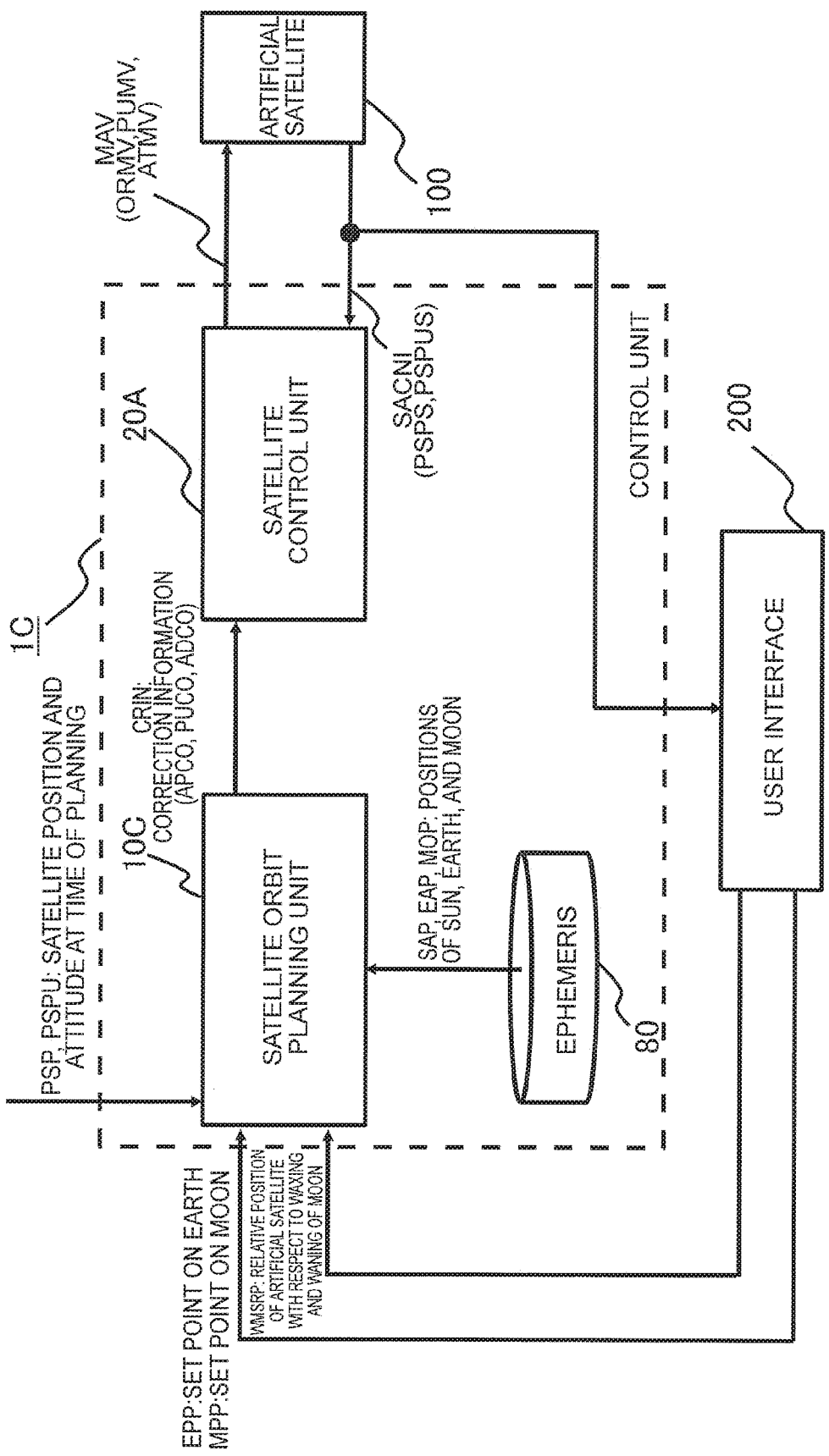
FIG. 12 is a schematic functional block diagram for illustrating the overall configuration of the lunar orbiting satellite system according to a third embodiment of the present invention.

FIG. 12 is a schematic functional block diagram for illustrating an overall configuration of the lunar orbiting satellite system according to a third embodiment of the present invention. A difference between the third embodiment and the first and second embodiments resides in the control unit 1C, and the other configurations are basically the same. Moreover, the satellite control unit 20A in the control unit 1C is basically the same as those in the first and second embodiments.

In the third embodiment of the present invention, for example, a description is given of details of a configuration of using a group of artificial satellites orbiting around the moon and the waxing and waning of the moon, so as to generate a set pattern set in advance when seen from the ground.

The artificial satellite orbits around the moon. At least one artificial satellite flies on at least one orbital plane. Orbit control and attitude control set in advance are executed for the artificial satellite based on the maneuvering amount MAV (ORMV, PUMV, ATMV) for the control, which is an output from the control unit 1C.

The control unit 1C includes the satellite orbit planning unit 10C. The satellite orbit planning unit 10C inputs:

a set point (EPP) on the earth set in advance shown in FIG. 2, a set point (MPP) on the moon set in advance, a relative position (WMSRP) of the artificial satellite 100 with respect to a shape of the waxing and waning of the moon, a position SAP of the sun, a position (EAP) of the earth, and the position (MOP) of the moon from the ephemeris 80, and a satellite position at the time of planning (PSP) and a satellite attitude at the time of planning (PSPU) observed by a base station or the like. Moreover, the satellite orbit planning unit 10C assigns a flashing function for entertainment to the artificial satellite 100, calculates the target orbit (TOR) for moving to a satellite arrangement position set in advance from a state of the artificial satellite 100, which has already been flying, and calculates the possible date and time (PDT) at which the flashing function becomes available. Further, the satellite orbit planning unit 10C calculates the arrangement position command (APCO), the attitude command (PUCO), and the antenna direction command (ADCO) of the artificial satellite based on the function (FUN), the target orbit (TOR), the possible date and time (PDT), the satellite position at the time of planning (PSP), and the satellite attitude at the time of planning (PSPU). Then, the satellite orbit planning unit 10C outputs the arrangement position command (APCO), the attitude command (PUCO), and the antenna direction command (ADCO) to the satellite control unit 20A.

In this configuration, in addition to the relative position MSRP with respect to the moon in the first embodiment and the second embodiment, the relative position WMSRP contains such information on the waxing and waning of the moon that the shape of the moon providing the flashing function is achieved in predetermined waxing and waning of the moon. That is, the relative position WMSRP contains a shape of the waxing and waning of the moon seen from the set point (EPP) on the earth and a relative positional relationship between the artificial satellite 100 and the shape of the waxing and waning of the moon.

The hardware configuration in the third embodiment is basically the same as that in the first or second embodiment described in FIGS. 19A and 19B.

Figure 13:
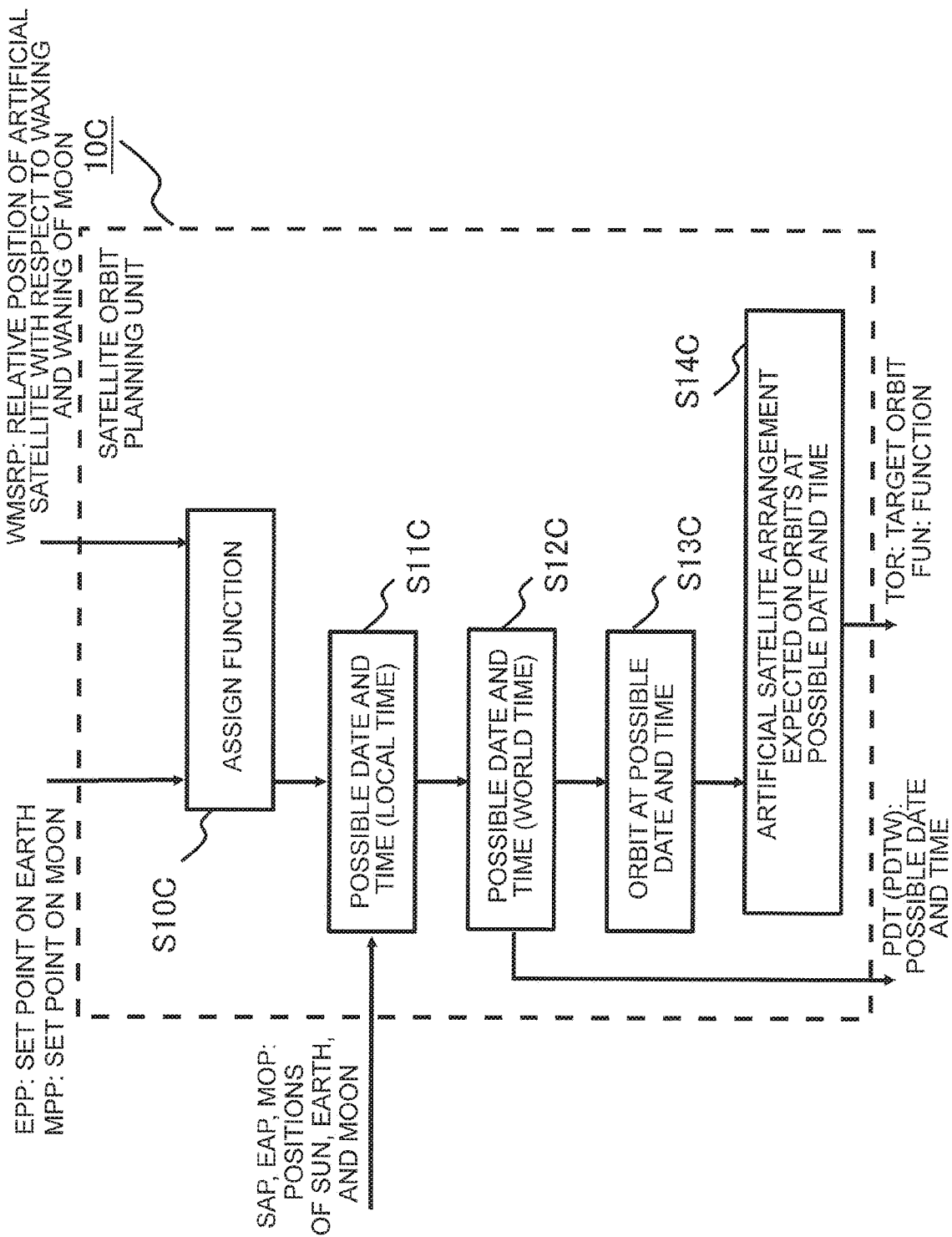
FIG. 13 is an operation flowchart for illustrating a part of an operation of the satellite orbit planning unit in the lunar orbiting satellite system according to a third embodiment of the present invention.
Figure 14:
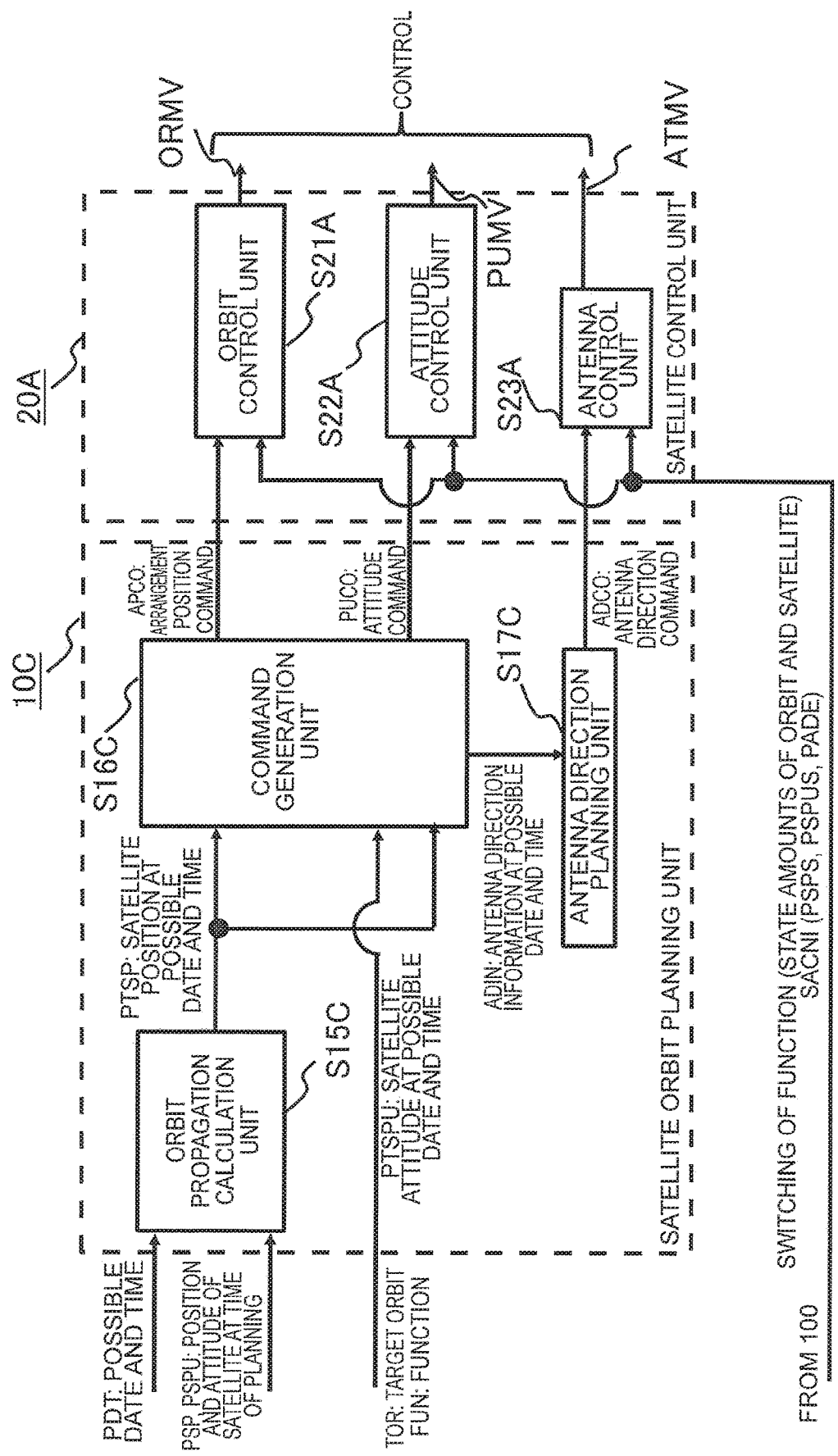
FIG. 14 is a functional block diagram for illustrating a part of the satellite orbit planning unit and the satellite control unit in the lunar orbiting satellite system according to the third embodiment of the present invention.

Referring to an operation flowchart of FIG. 13 and a functional block diagram of FIG. 14, a description is now given of the satellite orbit planning unit 10C. As an example, a consideration is given of a state in which there are three polar orbits passing above the south pole of the moon, the radius of the orbit is 3.62 times the radius of the moon, and four artificial satellites are flying on each polar orbit. Then, it is assumed that a command of generating a symbol set in advance on the night sky is input from the user interface 200. The satellite orbit planning unit 10C obtains the three-dimensional position vector $r_{BS}$ that achieves the relative position WMSRP of the artificial satellite with respect to the set point (EPP) on the earth corresponding to a position of a user and the shape of the waxing and waning of the moon, namely, the two-dimensional position vector ($r_{BS}^{(C)}$), at a time when the moon and the artificial satellite are observed from the set point (EPP) on the earth. More specifically, the shape (MWF) of the waning and waxing of the moon observed from the input set point (EPP) on the earth and the three-dimensional position vector $r_{BS}$ achieving the relative positional relationship between the artificial satellite and the shape of the waxing and waning of the moon, namely, the relative position (WMSRP) two-dimensional position vector ($r_{BS}^{(C)}$) are obtained, and the flashing function is assigned to the artificial satellites that can be observed from the set point (EPP) on the earth (Step S10C).

As an example, in response to a command from the user to generate a laughing face from the moon in a banana shape and two eyes (namely, two artificial satellites) arranged on a side of a concave portion of the moon in the banana shape, a possible date (PD) is determined from a day on which the moon in a thickness substantially corresponding to the banana shape (five days old in age of the moon) is seen. For example, when the command is received on Mar. 12, 2017, as the information on the waxing and waning shape of the moon based on a moon phase calender, Apr. 2, 2017 is determined as a day on which the five-day-old moon is seen next time. The five-day-old moon is seen in the evening, and the evening of the Apr. 2, 2017, for example, 18 o'clock, Apr. 2, 2018, is determined as the possible date and time (local time) (PDTD) (Step S11C).

The possible date and time (world time) (PDTW) is determined by inputting information on where the user is on the earth, as the set point (EPP) on the earth, from the user interface 200 (Step S12C). When the user is in Osaka, the time difference with respect to the world time is +nine hours, and 9 o'clock, Apr. 2, 2017 is thus determined as the possible date and time (world time) (PDTW).

Then, a direction of the orbital plane of the artificial satellite group at the possible date and time (world time) (PDTW) can be obtained by a general method of the astrodynamics when orbit control is not particularly executed (Step S13C).

For example, consideration is given to a lunar orbiting artificial satellite group formed of such three circular orbits that the orbital radius of the artificial satellites crossing an east longitude of 30 degrees, an east longitude of 150 degrees, and a west longitude of 90 degrees in selenographic longitude is 3.62 times the radius of the moon, and the orbital inclination angle is 90 degrees at 9 o'clock, Mar. 12, 2017 (world time). For the sake of clear description, it is assumed that the lunar orbiting artificial satellite group is not influenced by orbital disturbance. The directions of the orbital planes of the artificial satellite group are determined to be directions crossing the east longitude of 150 degrees, the west longitude of 90 degrees, and the east longitude of 30 degrees in selenographic longitude at 9 o'clock, Apr. 2, 2017 based on the orbit arrangement positions with respect to the moon, which are the input, that is, the relative positions (WMSRPs) of the artificial satellites with respect to the waxing and waning of the moon. Orbital positions existing on these three orbits, and achieving the laughing face formed of two eyes arranged on the moon in the banana shape are selected (Step S14C). Those orbital positions are the arrangement positions of the artificial satellites to be achieved, which are output in Step S14C, namely, the target orbits TOR.

In this state, the target orbit TOR is the expected arrangement position ESAP of the artificial satellite for achieving the flashing function on the orbital plane on which the artificial satellite is flying. This arrangement position ESAP is a region in which a set error is allowed. That is, the target orbit TOR is a terminal state at the possible date and time (world time), namely, a terminal time point.

A position that the satellite reaches at the possible date and time (world time) (PDTW), namely, the satellite position (PTSP) and the satellite attitude (PTSPU) at the possible date and time from the satellite position at the time of planning (PSP) and the satellite attitude at the time of planning (PSPU) observed at the base station or the like when the orbit control for the artificial satellite is not executed is calculated through numerical integration based on a motion equation, namely, an orbit propagation, by the orbit propagation calculation unit S15C, thereby obtaining the satellite position (PTSP) and the satellite attitude (PTSPU) of the artificial satellite 100 at the possible date and time, that is, the possible date and time (world time) (PDTW) (Step S15C). The orbit propagation is numerically integrated based on the current satellite position (PSP) at the current date and time and the current date and time (PRDT) in the case of the satellite position, for example. This is numerical integration when the current satellite position (PSP) is set to an initial state, and a period from the current date and time (PRDT) to the possible date and time (world time) (PDTW) is fixed. Consideration should be given to such a point that the position and the attitude of the satellite at the possible date and time (world time) (PDTW), namely, the terminal state of the satellite is indefinite.

The command generation unit S16C generates the arrangement position command (APCO) and the attitude command (PUCO) for the artificial satellite based on the satellite position (PTSP) and the satellite attitude (PTSPU) at the possible date and time (PDT) of the artificial satellite and the target orbit (TOR) (Step S16C). Further, the command generation unit S16C calculates the antenna direction information (ADIN) at the possible date and time containing a direction for directing an antenna mounted on the artificial satellite 100 toward the set point (EPP) on the earth or the set point (MPP) on the moon, and an antenna direction planning unit S17C in a subsequent stage generates the antenna direction command (ADCO) moment by moment (Step S17C).

The arrangement position command (APCO), the attitude command (PUCO), and the antenna direction command (ADCO) for the artificial satellite correspond to the correction information (CRIN) for transition to the target orbit (TOR). As generation means for the arrangement position command (APCO) and the attitude command (PUCO), for example, a publicly known technology represented by the model predictive control can be used. This generation means may be any means as long as the means is configured to successively obtain a command while minimizing an evaluation function set in advance for an interval between the initial state of the satellite position at the time of planning (PSP) and the terminal state of the artificial satellite at the possible date and time (world time) (PDTW).

The operation of the satellite control unit 20A is basically the same as that in the first or second embodiment described in FIG. 4.

A simple numerical example is now described in terms of the orbit control for the artificial satellites. A position that the satellite reaches at 9 o'clock, Apr. 2, 2017, namely, a satellite position at the possible date and time (PDT) from the satellite position at the time of planning (PSP) when the orbit control is not executed is calculated through numerical integration based on a motion equation, namely, the orbit propagation (orbit propagation calculation unit S15C).

An orbital period is changed by changing the orbital radius of the satellite through a general method of the orbital dynamics, and the satellite position can be moved compared with a case in which the orbital radius is not changed. For example, it is assumed that an orbital deviation is 22 degrees in phase. In order to shift 22 degrees in 22 days, which is the difference between the date of reception of a request from the user interface 200 and the possible date (PD), it is required to shift one degree per day. When the orbital altitude is 3.62 times the radius of the moon, the orbital period of the lunar orbiting satellite is approximately half a day, and thus it is required to shift 0.5 degrees per orbital period.

One orbital period corresponds to 360 degrees in phase, and the orbital period is required to be shifted by 1/720 (=0.5/360) times in order to shift 0.5 degrees per orbital period. The orbital period is proportional to the orbital radius to the power of 1.5, and thus the orbital radius is required to be shifted by 1/1080 times in order to shift the orbital period by 1/720 times. That is, the orbital altitude is required to be changed by 3.62/1080 times the radius of the moon, namely, approximately 6 kilometers.

A simple specific example is now described in terms of the attitude control for the artificial satellites. For example, consideration is given of a case in which the artificial satellite provides the flashing function for achieving "the eye of the laughing face". Directions of the sun, the earth (the above-mentioned set point on the earth), and the moon as seen from the artificial satellite are calculated. Then, a direction of a center line of an angle formed by the direction of the sun as seen from the artificial satellite and the direction of the earth (the above-mentioned set point on the earth) as seen from the artificial satellite is calculated. Then, the attitude of the satellite is determined so that a direction of a normal line of a reflection surface matches the direction of the center line. As a result, incident light from the sun is reflected on a mirror surface (LME) of the satellite, and is directed to the earth (the above-mentioned set point on the earth). A rotation angle around the normal line of the mirror surface is arbitrary. Thus, this rotation angle is adjusted so that the attitude disturbance received from the moon and the sun becomes convenient for a purpose of control. The direction of the normal line of the mirror surface and the rotation angle therearound are obtained as an output of the satellite control unit 20A by the sequence of the above-mentioned processing.

Alternatively, the following consideration may be given. For example, consideration is given of a case in which the artificial satellite does not provide the flashing function for achieving "the eye of the laughing face". The directions of the sun, the earth (the set point (EPP) on the earth), and the moon as seen from the artificial satellite are calculated. Then, the direction of the center line of the angle formed by the direction of the sun as seen from the artificial satellite and the direction of the earth (the set point (EPP) on the earth) as seen from the artificial satellite is calculated. Then, such a satellite attitude that the attitude disturbance received from the moon and the sun is convenient for the purpose of control is obtained. The direction of the normal line of the mirror surface in this satellite attitude is calculated. In this state, whether or not the light incident from the sun is reflected on the mirror surface, and toward which direction the light is reflected when the light is reflected are calculated. In this state, when the reflected light does not reach the ground, the mirror surface is not seen from the ground as it shines, and thus the direction of the normal line is not required to be calculated. On the contrary, when the reflected light reaches the ground, the mirror surface is seen from the ground as it shines, and the direction of the normal line (thus, the attitude of the satellite) of the mirror surface is adjusted so that the reflected light does not reach the ground. The direction of the normal line of the mirror surface and the rotation angle therearound are obtained as an output of the satellite control unit 20A by the sequence of the above-mentioned processing.

With the above-mentioned third embodiment, the flashing function of the artificial satellite is assigned depending on the relative position (MSRP) of the artificial satellite with respect to the moon at a time when the moon and the artificial satellite are observed from the input set point (EPP) on the earth, and thus it is possible to increase efficiency of use of the artificial satellite having the so-called standby time in which the function is not available, or freely design a state in which the satellite can be observed from the earth.

That is, for example, the artificial satellite group can be used as the flashing function for entertainment in accordance with a user request input to the user interface 200. Specifically, the artificial satellite group can be shown as a pattern of a combination of the moon and the artificial satellites set in advance when seen from the ground at the set time point. Moreover, the artificial satellite group can be shown as the pattern of the combination of the moon and the artificial satellites set in advance when seen from the ground at the set time point without executing excessive orbit control. Further, the pattern of the combination of the moon and the artificial satellites can be shown when the moon reaches the set direction as seen from the ground for several days, and the number of variations of the pattern of the combination of the moon and the artificial satellites can be increased.

In this state, variations of the patterns of the moon and the artificial satellites are exemplified as an example of the entertainment service provided by the lunar orbiting satellite system according to one embodiment of the present invention. FIG. 15 includes diagrams for illustrating patterns of the moon (MOO) in the banana shape and the artificial satellite group 100a (1.1, 1.2, 1.3, 1.4, 2.1, 2.2, 2.3, 2.4, 3.1, 3.2, 3.3, and 3.4). The artificial satellite group 100a has the three lunar orbital planes. The four artificial satellites are flying on each of the orbital planes. For example, the artificial satellite 1.1 indicates a first vehicle on a first orbital plane. Filled artificial satellites are artificial satellites that reflect light, and outlined artificial satellites are artificial satellites that do not reflect light.

In sections (a) and (b) of FIG. 15, the moon (MOO) in the banana shape is a crescent moon protruded toward the right side. In a state illustrated in the section (a) of FIG. 15, the two artificial satellites (1.3 and 3.3) on a side of a recessed surface of the moon (MOO) in the banana shape are reflecting the sunlight to the ground. In this case, the moon (MOO) and the artificial satellites can be caused to appear as a laughing face as seen from the ground. Moreover, in a state illustrated in the section (b) of FIG. 15, the two artificial satellites (1.1 and 3.1) on a side of a protruded surface of the moon (MOO) in the banana shape are reflecting the sunlight to the ground. In this case, the moon (MOO) and the artificial satellites can be caused to appear as a crying face as seen from the ground.

Moreover, other examples of the pattern are illustrated in FIG. 16. Also in FIG. 16, as in FIG. 15, the lunar orbiting satellite system has the three lunar orbital planes. The four artificial satellites 100*a* (1.1, 1.2, 1.3, and 1.4, 2.1, 2.2, 2.3, and 2.4, 3.1, 3.2, 3.3, and 3.4) are flying on each of the orbital planes. Filled artificial satellites are artificial satellites that reflect light, and outlined artificial satellites are artificial satellites that do not reflect light. A V pattern illustrated in a section (a) of FIG. 16, a circle pattern illustrated in a section (b) of FIG. 16, and a pattern of a symbol of a money exchanger illustrated in a section (c) of FIG. 16 can be generated by using a plurality of artificial satellites on each of the orbital planes.

The moon revolves around the earth in the period of approximately 29.5 days. Therefore, the meridian passage is delayed by approximately one hour per day. Therefore, when the moon is observed at the same time on the following day, the moon is observed at a position displaced toward east by approximately 12 degrees.

FIG. 17A is a diagram for illustrating a V pattern that is an example of how the moon (MOO) and the lunar orbiting artificial satellite group 100*a* are observed in the south sky above the earth surface (EARS) at 24 o'clock from the set point (EPP) on the earth.

FIG. 17B is a diagram for illustrating how the moon (MOO) and the lunar orbiting artificial satellite group 100*a* are observed at 24 o'clock and 1 o'clock on the following day in the related art.

FIG. 17C is a diagram for illustrating how the moon (MOO) and the lunar orbiting artificial satellite group 100*a* are observed at 24 o'clock and 1 o'clock on the following day in one embodiment of the present invention.

Thus, the function of the satellite orbit planning unit 10C also includes the adjustment of the orbital period of the artificial satellites 100 by an amount of the shift in the observed position of the artificial satellites 100 caused by the revolution period of the moon (MOO). Specifically, the orbital period of the artificial satellites 100 or the artificial satellite group 100*a* is only required to be adjusted to 1.03 times to 1.05 times (that is, a period equal to or longer than 1.03 times and equal to or shorter than 1.05 times) the rotation period of the earth or one integer-th thereof. With this configuration, as illustrated in FIG. 17B, how the moon (MOO) and the lunar orbiting artificial satellite group 100*a* are observed at 1 o'clock on the following day can be the same as how the moon (MOO) and the lunar orbiting artificial satellite group 100*a* are observed at 24 o'clock on the previous day. That is, the observed shapes of the arranged artificial satellites 100 are the same between FIG. 17A and FIG. 17C. That is, the arrangement positions of the artificial satellites can be made to be effective at the time of observation from the ground when the moon is observed at approximately the same position on the previous day and on the following day.

In the third embodiment, for example, as schematically illustrated in FIG. 20, each of the artificial satellites 100 includes the large structured mirror LME configured to reflect the sunlight toward the ground, and the control unit 2A on the artificial satellite side having a mirror control unit 2Aa configured to control, for example, a mirror control direction defining a direction of the mirror based on the position of the sun, the position of the artificial satellite, and a point on the ground that is irradiated with the reflected sunlight, for example, the set point (EPP) on the earth.

With this configuration, the artificial satellites can be shown sufficiently bright when seen from the ground at the set time point.

Further, the large structured mirror LME may be provided with a sunlight transmittance control device LC configured to be able to individually control the transmittance of the sunlight so as to reflect the sunlight toward the ground.

With this configuration, the brightness of the artificial satellite group can be adjusted when seen from the ground at the set time point. Moreover, a control torque is generated by controlling the transmittance of each sunlight transmittance control device LC, thereby balancing the generated torque with a disturbance torque, for example, a gravity gradient torque, acting on the large structured mirror LME so as to be able to maintain the direction of the large structured mirror LME. Further, a control torque is generated by controlling the transmittance in each sunlight transmittance control device LC, thereby being able to change the attitude of the artificial satellite or the large structured mirror LME.

Fourth Embodiment

Figure 18:
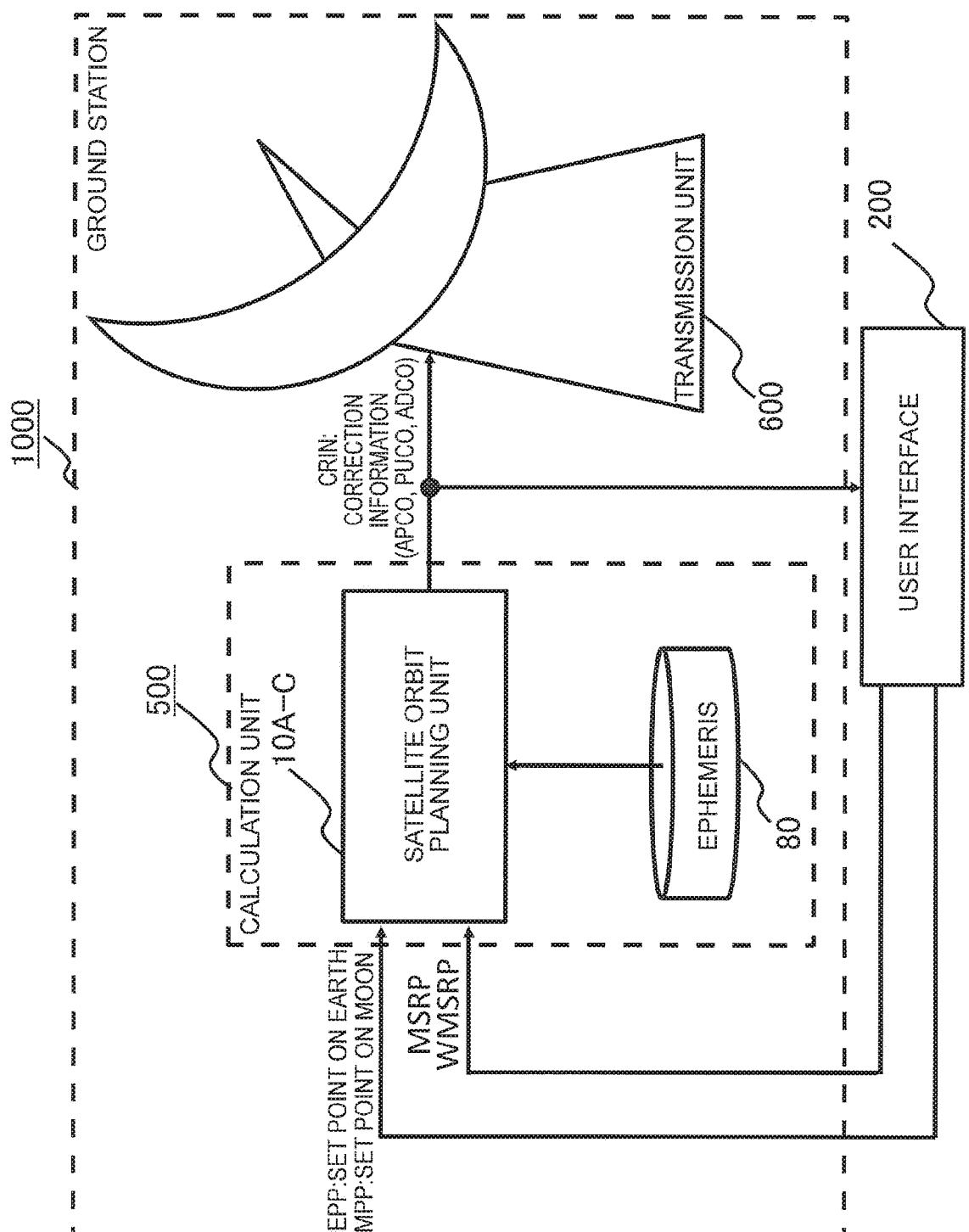
FIG. 18 is a schematic diagram for illustrating a ground station in a case in which the satellite orbit planning unit of the lunar orbiting satellite system according to a fourth embodiment of the present invention is provided on a side of the ground station.

FIG. 18 is a schematic diagram for illustrating a ground station in a case in which the satellite orbit planning unit of the lunar orbiting satellite system according to a fourth embodiment of the present invention is installed on a side of the ground station. Although, in the first to third embodiments, it is assumed that the satellite orbit planning units 10A, 10B, and 10C respectively illustrated in FIG. 1, FIG. 7, and FIG. 12 are mounted on the side of the artificial satellites, the satellite orbit planning unit 10A-C is installed on the side of the base station 100 in the fourth embodiment. In this case, the satellite control unit 20A of FIG. 1, FIG. 7, and FIG. 12 is installed on the side of each of the artificial satellites 100 as illustrated as a satellite body control unit 2Ab of the control unit 2A on the side of the artificial satellite, for example, illustrated in FIG. 20.

Similarly to the embodiments described above, the ground station 100 includes:

a calculation unit 500 configured to assign the function (FUN) to each of the plurality of artificial satellites 100 forming the artificial satellite group flying around the moon depending on the two-dimensional projected relative position (MSRP) of the artificial satellite 100 with respect to the moon when the moon and the artificial satellite 100 are observed from the input set point (EPP) on the earth, set the target orbit (TOR) in accordance with the function (FUN), and use the target orbit (TOR) so as to obtain the correction information (CRIN) for transition to the target orbit (TOR) containing the arrangement position command (ARCO), the attitude command (PUCO), and the antenna direction command (ADCO) for the artificial satellite; and a transmission unit 600 configured to transmit the correction information (CRIN) to the artificial satellite 100.

Moreover, the calculation unit 500 includes the satellite orbit planning unit 10A-C and the ephemeris 80, which is the storage unit described in the first to third embodiments. The satellite orbit planning unit 10A-C has the function of at least one of the three satellite orbit planning units 10A, 10B, and 10C in the first to third embodiments.

The hardware configuration in the fourth embodiment is the same as that in the first to third embodiments described in FIGS. 19A and 19B. That is, the calculation unit 500 of the ground station 1000 may be the same as one of the satellite orbit planning units 10A, 10B, and 10C in the first to third embodiments, and the satellite control unit provided on the artificial satellite 100 side may be the same as the satellite control unit 20A in any one of the first to third embodiments.

With such a configuration, in response to a change in request from a business operator, which has occurred after the artificial satellites were launched, a plurality of artificial satellites can be provided for multiple applications including communication, positioning, and entertainment.

For example, in each of the first to third embodiments, the satellite orbit planning units 10A, 10B, and 10C are configured to generally plan the orbit control, the attitude control, and the antenna control for the artificial satellites for flying at least one artificial satellite on each of the at least two orbital planes relatively arranged at an angle equal to or larger than 30 degrees and equal to or smaller than 120 degrees.

Moreover, in the first embodiment, the satellite orbit planning unit 10A assigns the communication function to the artificial satellite 100 based on the correction information (CRIN) obtained in accordance with the target orbit (TOR) and the function (FUN). Then, regarding the attitude of the artificial satellite 100 to which the communication function is assigned, the satellite orbit planning unit 10A creates, based on the correction information (CRIN), a plan of directing the antenna CAN for communication to/from the lunar surface, which is a part of the antenna group CAN for communication of the artificial satellite 100 illustrated in FIG. 20 and provided in the artificial satellite 100, toward the set point (MPP) on the moon, and directing the antenna CAN for communication to/from the ground, which is a part of the same antenna group CAN provided in the artificial satellite 100, toward the set point (EPP) on the earth. The plan for the antenna control is executed by the antenna direction planning unit S17A.

Moreover, in the second embodiment, the satellite orbit planning unit 10B assigns the function of positioning on the lunar surface to the artificial satellite 100 based on the correction information (CRIN) obtained in accordance with the target orbit (TOR) and the function (FUN). Then, the artificial satellite 100, to which the function of positioning on the lunar surface is assigned based on the correction information (CRIN), creates a plan of directing the antenna PAN for positioning, which is a part of the antenna group PAN for positioning of the artificial satellite 100 illustrated in FIG. 20 and provided in the artificial satellite 100, toward the moon. Similarly, the artificial satellite 100, to which the function of positioning between the ground and the moon is assigned, creates a plan of directing the antenna PAN for positioning, which is a part of the same antenna group PAN, toward the earth. The plan for the antenna control is executed by the antenna direction planning unit S17B.

Moreover, in the third embodiment, the satellite orbit planning unit 10C assigns the function of forming the pattern of arrangement of the artificial satellites to the artificial satellite 100 based on the correction information (CRIN) obtained in accordance with the target orbit (TOR) and the function (FUN). Then, the satellite orbit planning unit 10C plans the attitude of the artificial satellite 100 to which the function of forming the pattern is assigned based on the correction information (CRIN) so that the sunlight is radiated to the set point (EPP) on the earth, and plans the attitude of the artificial satellite 100 to which the function of forming the pattern is not assigned so that the sunlight is not radiated to the set point (EPP) on the earth. The plan for the antenna control is executed by the antenna direction planning unit S17C.

The present invention is not limited to each of the above-mentioned embodiments, and includes all possible combinations of those embodiments.

INDUSTRIAL APPLICABILITY

The lunar orbiting satellite system and the ground station of the lunar orbiting satellite system according to one embodiment of the present invention can be applied to lunar orbiting satellite systems in various forms.

REFERENCE SIGNS LIST

1A, 1B, 1C control unit; 10A, 10B, 10C satellite orbit planning unit; 20A satellite control unit; 100 artificial satellite; 100*a* artificial satellite group; 200 user interface; 600 transmission unit; 1000 ground station; 2000 processing circuit; 3000 processor; 3100 memory

The invention claimed is:

1. A lunar orbiting satellite system, comprising:
    a plurality of artificial satellites to form an artificial satellite group flying around the moon;
    a controller to control the plurality of artificial satellites; and
    an interface to receive input of information for the control,
    wherein the controller includes:
        a satellite orbit plan calculator to assign a function to one of the plurality of artificial satellites depending on a two-dimensional projected relative position of the one of the plurality of artificial satellites with respect to the moon at a time when the moon and the one of the plurality of artificial satellites are observed from an input set point on the earth, and set a target orbit in accordance with the function; and
        a satellite controller to cause the one of the plurality of artificial satellites to execute control based on the function, to thereby switch the function.

2. The lunar orbiting satellite system according to claim 1, wherein the satellite orbit plan calculator calculates an orbit for transition from a current orbit of one of the plurality of artificial satellites to the target orbit as correction information; and
    wherein the satellite controller causes the one of the plurality of artificial satellites to execute orbit control based on the function and the correction information, to thereby achieve the target orbit.

3. The lunar orbiting satellite system according to claim 1, wherein the satellite orbit plan calculator obtains a three-dimensional actual relative position corresponding to the two-dimensional projected relative position at which one of the plurality of artificial satellites can be observed from both an input set point on the moon and the input set point on the earth.

4. The lunar orbiting satellite system according to claim 1, wherein the satellite orbit plan calculator obtains four or more three-dimensional actual relative positions corresponding to the two-dimensional projected relative position at which one of the plurality of artificial satellites can be observed from an input set point on the moon, and obtain four or more three-dimensional actual relative positions with respect to the two-dimensional projected relative position at which one of the plurality of artificial satellites can be observed from the input set point on the earth.

5. The lunar orbiting satellite system according to claim 1,
wherein the input two-dimensional projected relative position contains a shape of waxing and waning of the moon seen from a set point on the earth and a relative positional relationship between one of the plurality of artificial satellites and the shape of waxing and waning of the moon, and
wherein the satellite orbit plan calculator obtains a three-dimensional actual relative position corresponding to the input two-dimensional projected relative position.

6. The lunar orbiting satellite system according to claim 1, wherein the satellite orbit plan calculator adjusts an orbital period of the artificial satellite group to a period equal to or longer than 1.03 times a rotation period of the earth and equal to or shorter than 1.05 times the rotation period of the earth, or one integer-th thereof.

7. The lunar orbiting satellite system according to claim 1, wherein the satellite orbit plan calculator plans orbit control, attitude control, and antenna control of the plurality of artificial satellites so that at least one of the plurality of artificial satellites flies on each of at least two orbital planes arranged relatively at an angle equal to or larger than 30 degrees and equal to or smaller than 120 degrees.

8. The lunar orbiting satellite system according to claim 3,
wherein the satellite orbit plan calculator assigns a communication function to one of the plurality of artificial satellites based on correction information obtained in accordance with the target orbit and the function, and
wherein the controller further includes an antenna direction plan calculator to, regarding an attitude of the one of the plurality of artificial satellites to which the communication function is assigned and based on the correction information obtained in accordance with the target orbit and the function, create a plan of directing an antenna, which is provided in the one of the plurality of artificial satellites so as to communicate to/from the lunar surface, toward the set point on the moon, and create a plan of directing an antenna, which is provided in each of the plurality of artificial satellites so as to communicate to/from the ground, toward the set point on the earth.

9. The lunar orbiting satellite system according to claim 4,
wherein the satellite orbit plan calculator assigns a function of positioning on the lunar surface to one of the plurality of artificial satellites based on correction information obtained in accordance with the target orbit and the function, and
wherein the controller further includes an antenna direction plan calculator to, based on the correction information obtained in accordance with the target orbit and the function, produce a plan of directing, by the one of the plurality of artificial satellites to which the function of positioning on the lunar surface is assigned, an antenna for positioning, which is provided in the one of the plurality of artificial satellites, toward the moon, and produce a plan of directing, by one of the plurality of artificial satellites to which a function of positioning between the ground and the moon is assigned, an antenna for positioning, which is provided in the one of the plurality of artificial satellites, toward the earth.

10. The lunar orbiting satellite system according to claim 5,
wherein the satellite orbit plan calculator assigns a function of forming a pattern of arrangement of the plurality of artificial satellites to one of the plurality of artificial satellites based on correction information obtained in accordance with the target orbit and the function, and
wherein the controller further includes an antenna direction plan calculator to, based on the correction information obtained in accordance with the target orbit and the function, plan an attitude of the one of the plurality of artificial satellites to which the function of forming the pattern is assigned so that the sunlight irradiates the set point on the earth, and plan an attitude of one of the plurality of artificial satellite to which the function of forming the pattern is not assigned so that the sunlight does not irradiate the set point on the earth.

11. The lunar orbiting satellite system according to claim 10, wherein each of the plurality of artificial satellites includes:
a large structured mirror to reflect the sunlight toward the ground; and
a satellite side controller on a side of the each of the plurality of artificial satellites, which includes a mirror controller to determine a direction of the large structured mirror based on a position of the sun, a position of the each of the plurality of artificial satellites, and an irradiated point on the ground that reflected light of the sunlight irradiates.

12. The lunar orbiting satellite system according to claim 11, wherein the large structured mirror includes a sunlight transmittance controller to control transmittance of the sunlight.

13. A ground station of a lunar orbiting satellite system, comprising:
a satellite orbit plan calculator to assign a function to each of a plurality of artificial satellites forming an artificial satellite group flying around the moon depending on a two-dimensional projected relative position of the each of the plurality of artificial satellites with respect to the moon at a time when the moon and the each of the plurality of artificial satellites are observed from an input set point on the earth, set a target orbit in accordance with the function, and use the target orbit so as to obtain correction information; and
a transmitter to transmit the correction information to the each of the plurality of artificial satellites.

* * * * *